(12) United States Patent
Kim et al.

(10) Patent No.: US 10,725,828 B2
(45) Date of Patent: Jul. 28, 2020

(54) TASK SCHEDULING METHOD AND ELECTRONIC DEVICE FOR IMPLEMENTING SAME

(71) Applicant: Samsung Electronics Co., Ltd, Suwon-si (KR)

(72) Inventors: Kiljae Kim, Suwon-si (KR); Jaeho Kim, Seoul (KR); Daehyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/086,301

(22) PCT Filed: Feb. 21, 2017

(86) PCT No.: PCT/KR2017/001900
§ 371 (c)(1),
(2) Date: Sep. 18, 2018

(87) PCT Pub. No.: WO2017/160003
PCT Pub. Date: Sep. 21, 2017

(65) Prior Publication Data
US 2019/0108066 A1    Apr. 11, 2019

(30) Foreign Application Priority Data
Mar. 18, 2016    (KR) ........................ 10-2016-0032867

(51) Int. Cl.
*G06F 9/46*    (2006.01)
*G06F 9/50*    (2006.01)
(Continued)

(52) U.S. Cl.
CPC .............. *G06F 9/5044* (2013.01); *G06F 9/28* (2013.01); *G06F 9/38* (2013.01); *G06F 9/4856* (2013.01);
(Continued)

(58) Field of Classification Search
None
See application file for complete search history.

(56) References Cited

U.S. PATENT DOCUMENTS

2005/0132239 A1    6/2005  Athas et al.
2007/0050778 A1*   3/2007  Lee ..................... H04N 5/44591
                                                 718/107
(Continued)

FOREIGN PATENT DOCUMENTS

KR    10-2011-0128023 A    11/2011
KR    10-2013-0138146 A    12/2013
(Continued)

OTHER PUBLICATIONS

Linux, "[Linux] cgroup—(task) control group (1)", http://studyfoss.egloos.com/5505982, Apr. 2, 2011, 10 pages.
(Continued)

*Primary Examiner* — Gregory A Kessler

(57) ABSTRACT

Various embodiments provide an electronic device and a method, the electronic device comprising: a memory; a first processor; a second processor which has attributes different from those of the first processor; and a control unit, wherein the control unit is configured to identify a task loaded into the memory, select which of the first processor and the second processor is to execute the task, on the basis of attribute information corresponding to a user interaction associated with the task, and allocate the task to the selected processor. Other embodiments are also possible.

15 Claims, 15 Drawing Sheets

(51) Int. Cl.
*G06F 9/28* (2006.01)
*G06F 9/38* (2018.01)
*G06F 9/48* (2006.01)

(52) U.S. Cl.
CPC ...... *G06F 9/5027* (2013.01); *G06F 2209/483* (2013.01); *G06F 2209/508* (2013.01)

(56) References Cited

U.S. PATENT DOCUMENTS

| | | |
|---|---|---|
| 2007/0220294 A1 | 9/2007 | Lippett |
| 2009/0150893 A1 | 6/2009 | Johnson et al. |
| 2012/0017219 A1 | 1/2012 | Hsieh et al. |
| 2013/0318374 A1 | 11/2013 | Hum et al. |
| 2013/0332941 A1 | 12/2013 | Ramesh et al. |
| 2014/0059558 A1 | 2/2014 | Davis et al. |
| 2014/0173623 A1 | 6/2014 | Chang et al. |
| 2014/0181834 A1 | 6/2014 | Lim et al. |
| 2015/0040136 A1 | 2/2015 | Matthes et al. |
| 2015/0100964 A1 | 4/2015 | Na et al. |
| 2015/0160714 A1 | 6/2015 | Jun et al. |
| 2015/0186184 A1 | 7/2015 | Kim |
| 2015/0347184 A1 | 12/2015 | Kim et al. |
| 2016/0004569 A1 | 1/2016 | Kim et al. |

FOREIGN PATENT DOCUMENTS

| | | |
|---|---|---|
| KR | 10-1392934 B1 | 5/2014 |
| KR | 10-2014-0080058 A | 6/2014 |
| KR | 10-2015-0041406 A | 4/2015 |
| KR | 10-1509938 B1 | 4/2015 |
| KR | 10-2015-0067869 A | 6/2015 |
| KR | 10-2015-0075499 A | 7/2015 |
| KR | 10-1553650 B1 | 9/2015 |
| KR | 10-2015-0136345 A | 12/2015 |
| KR | 10-2016-0004152 A | 1/2016 |

OTHER PUBLICATIONS

International Search Report dated May 25, 2017 in connection with International Patent Application No. PCT/KR2017/001900.
Written Opinion of the International Searching Authority dated May 25, 2017 in connection with International Patent Application No. PCT/KR2017/001900.
Extended European Search Report regarding Application No. 17766904.1, dated Feb. 14, 2019, 9 pages.
Communication pursuant to Article 94(3) EPC dated Jan. 27, 2020 in connection with European Patent Application No. 17 766 904.1, 9 pages.

* cited by examiner

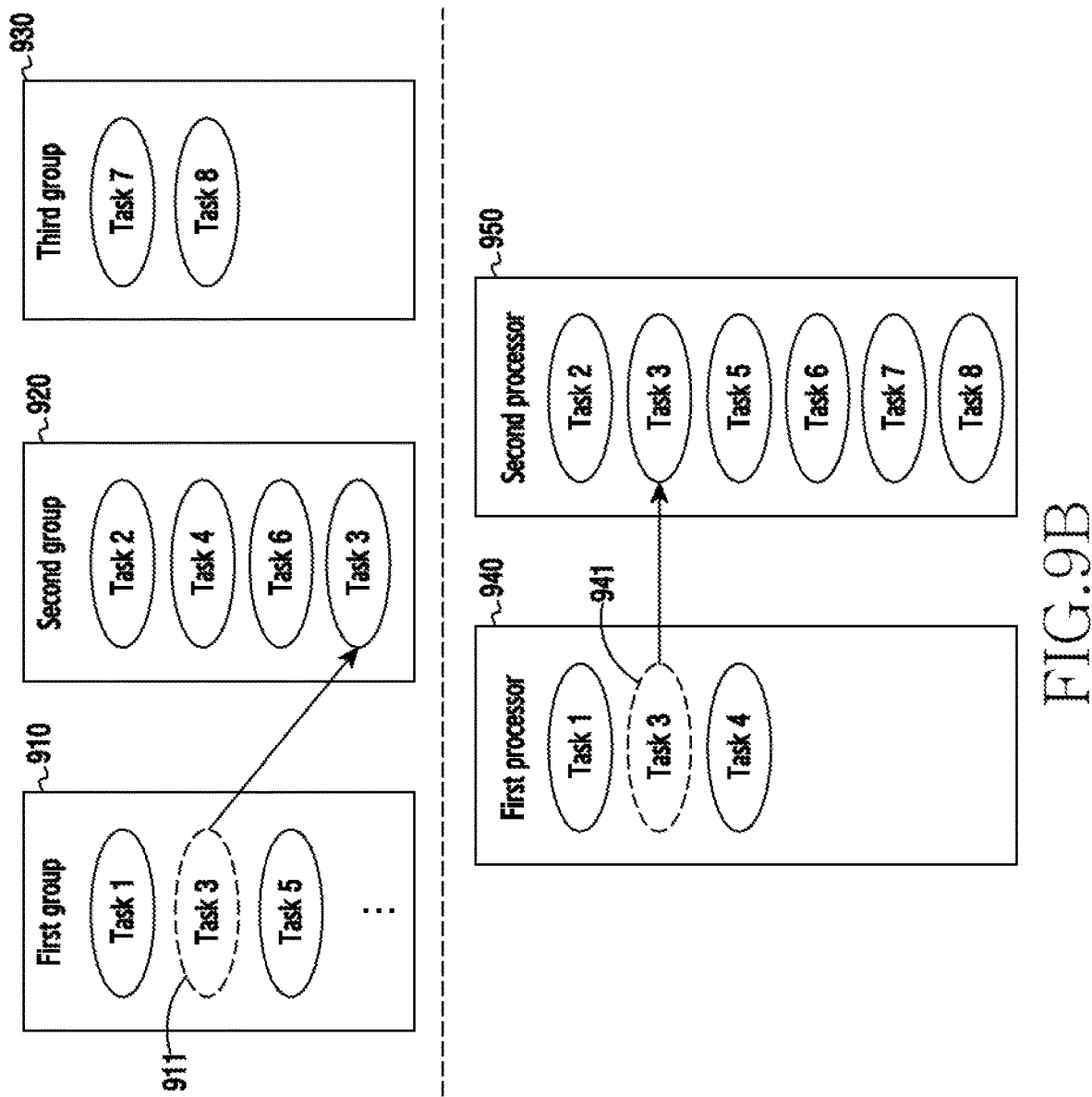

TASK SCHEDULING METHOD AND ELECTRONIC DEVICE FOR IMPLEMENTING SAME

CROSS-REFERENCE TO RELATED APPLICATIONS

This application is a 371 of International Application No. PCT/KR2017/001900 filed on Feb. 21, 2017, which claims priority to Korean Patent Application No. 10-2016-0032867 filed on Mar. 18, 2016, the disclosures of which are herein incorporated by reference in their entirety.

BACKGROUND

1. Field

The present disclosure relates to a task scheduling method and an electronic device implementing the same.

2. Description of Related Art

Recently, with the development of digital technologies, various types of electronic devices have been widely utilized, such as, mobile communication terminals, personal digital assistants (PDA), electronic organizers, smart phones, tablet personal computers (PC), wearable devices, and the like. The electronic device has various functions such as message transmission like a short message service (SMS)/multimedia message service (MMS), a video call, an electronic organizer, photography, email transmission/reception, broadcast reproduction, the Internet, music reproduction, schedule management, a social networking service (SNS), a messenger, a dictionary, a game, and the like.

A scheduling scheme implemented for a central processing unit (CPU) (or a processor) in the conventional heterogeneous multi-processor (HMP) system may determine a CPU that is to process a task, based on the load value of the task. For example, according to the scheduling scheme of the HMP structure, when the load value of the task exceeds a predetermined criterion, the task is allocated to a big CPU. When the load value of the task is less than or equal to the predetermined criterion, the task is allocated to a little CPU. That is, the scheduling scheme of the HMP structure may schedule all tasks using the same policy.

A scheduling scheme according to the conventional art schedules all tasks based on the same policy, and thus, a user may think that the performance of an electronic device is poor even though the performance of the electronic device is not poor. For example, when an electronic device does not quickly process a task (or a process) related to user interaction, the user may think that the performance of the electronic device is poor. Also, the electronic device migrates a task by taking into consideration only the load value of the task, and thus, the electronic device may allocate all tasks to a big CPU temporarily. In this instance, since the number of tasks allocated to the big CPU is large, the amount of current consumed by the electronic device may increase.

According to various embodiments, control is performed such that a task is allocated to a group, based on the degree of user interaction of the task, and the task is processed by a high-performance processor or a low-performance processor according to a schedule policy in the group to which the task is allocated.

SUMMARY

In accordance with an aspect of the present disclosure, there is provided an electronic device, including: a memory; a first processor; a second processor having an attribute different from that of the first processor; and a controller, wherein the controller is configured to: identify a task loaded in the memory; select a processor to execute the task from among the first processor and the second processor, based on attribute information corresponding to a user interaction related to the task; and allocate the task to the selected processor.

In accordance with another aspect of the present disclosure, there is provided an operation method of an electronic device, the method including: identifying a task loaded in a memory of the electronic device; selecting a processor to execute the task from among a first processor of the electronic device and a second processor of the electronic device based on attribute information corresponding to a user interaction related to the task; and allocating the task to the selected processor.

According to various embodiments, control is performed such that a task is allocated to a group based on the degree of user interaction of the task, and the task is processed by a high-performance processor or a low-performance processor according to a schedule policy in the group to which the task is allocated.

According to various embodiments, a schedule policy is set to be different for each group, whereby a task included in each group is efficiently allocated to a high-performance processor or a low-performance processor.

According to various embodiments, tasks allocated to a high-performance processor are sequentially migrated to a low-performance processor, based on the importance of the tasks, whereby the efficiency of an electronic device may increase.

According to various embodiments, control is performed such that the minimum number of tasks are allocated to a high-performance processor by setting a up-migration threshold included in each schedule policy to be different for each schedule policy, whereby the amount of current consumed by an electronic device may be reduced.

BRIEF DESCRIPTION OF THE DRAWINGS

FIGS. 9A to 9C are diagrams illustrating examples of changing a group for a task by an electronic device according to various embodiments;

DETAILED DESCRIPTION

Figure 1:
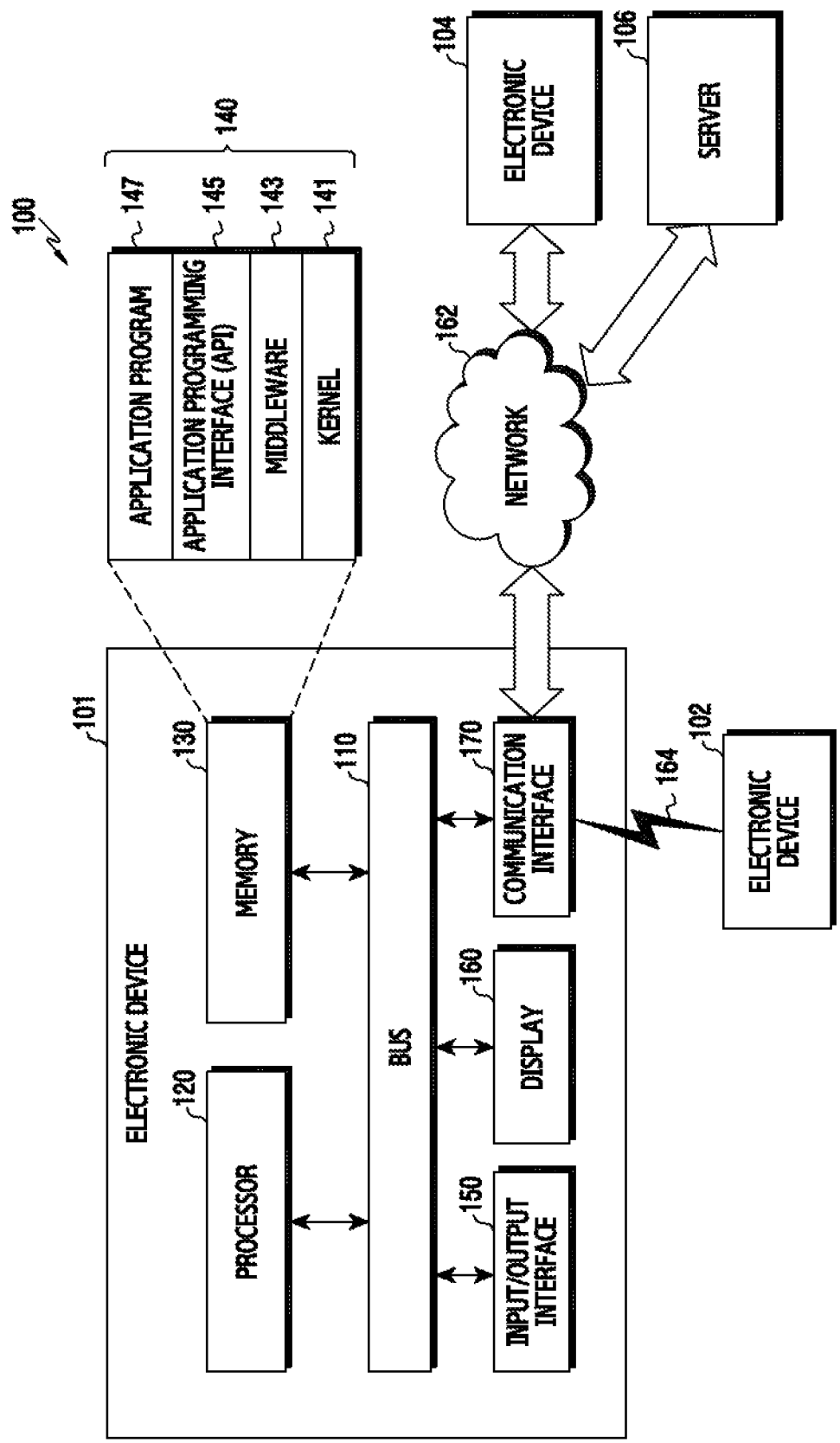
FIG. 1 is a diagram illustrating an electronic device within a network environment according to various embodiments.

Hereinafter, various embodiments of the present document are mentioned below with reference to the accompanying drawings. An embodiment and the terms used in this do not intend to limit the technology mentioned in the present document to a specific embodiment form, and should be construed as including various changes of the corresponding embodiment, equivalents thereof, and/or alternatives thereof. In the drawings, like reference symbols may denote like constituent elements. The expression of a singular form may include the expression of a plural form unless otherwise dictating clearly in context. In the present document, the expressions "A or B", "at least one of A and/or B", etc. may include all available combinations of words enumerated together. The expressions "1st", "2nd", "first", "second", etc. may modify corresponding constituent elements irrespective of order and/or importance, and are just used to distinguish one constituent element from another constituent element and do not limit the corresponding constituent elements. When it is mentioned that any (e.g., 1st) constituent element is "(operatively or communicatively) coupled with/to" or is "connected to" another (e.g., 2nd) constituent element, the any constituent element may be directly coupled to the another constituent element, or be coupled through a further constituent element (e.g., a third constituent element).

The expression "configured (or set) to~" used in the present document may be used interchangeably with, for example, "suitable for~", "having the capacity to~", "designed to~", "adapted to~", "made to~", or "capable of~" in a hardware or software manner in accordance to circumstances. In any situation, the expression "device configured to~" may represent that the device is "capable of ~" together with other devices or components. For example, the phrase "processor configured (or set) to perform A, B and C" may represent an exclusive processor (e.g., embedded processor) for performing a corresponding operation, or a generic-purpose processor (e.g., a central processing unit (CPU) or an application processor (AP)) capable of performing corresponding operations by executing one or more software programs stored in a memory device.

An electronic device according to various embodiments of the present document may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3) player, a medical device, a camera or a wearable device. The wearable device may include at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit). According to certain embodiment, the electronic device may, for example, include at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder or an electronic frame.

In another embodiment, the electronic device may include at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MRI), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of a financial institution, point of sales (POS) of shops, an internet of things (IoT) device (e.g., an electric bulb, various sensors, a sprinkler device, a fire alarm, a thermostat, a streetlight, a toaster, an exerciser, a hot water tank, a heater, a boiler, etc.).

According to certain embodiment, the electronic device may include at least one of a part of furniture, a building/structure or a car, an electronic board, an electronic signature receiving device, a projector or various metering devices (e.g., tap water, electricity, gas, radio wave metering devices or the like). In various embodiments, the electronic device may be flexible, or be a combination of two or more of the aforementioned various devices. The electronic device according to an embodiment of the present document is not limited to the aforementioned devices. In the present document, the term 'user' may denote a person who uses the electronic device or a device (e.g., an artificial-intelligent electronic device) which uses the electronic device.

FIG. 1 illustrates a block diagram of a network environment system according to an embodiment of the present disclosure.

Referring to FIG. 1, an electronic device 101 within a network environment 100 in various embodiments is described. The electronic device 101 may include a bus 110, a processor 120, a memory 130, an input output interface 150, a display 160, and a communication interface 170. In some embodiment, the electronic device 101 may omit at least one of the constituent elements or additionally have another constituent element. The bus 110 may, for example, include a circuit coupling the constituent elements 110, 120, 150, 160 and 170 with one another and forwarding communication (e.g., a control message or data) between the constituent elements. The processor 120 may include one or more of a central processing unit (CPU), an application processor (AP) or a communication processor (CP). The processor 120 may, for example, execute operation or data processing for control and/or communication of at least one another constituent element of the electronic device 101.

The memory 130 may include a volatile and/or non-volatile memory. The memory 130 may, for example, store a command or data related to at least one another constituent element of the electronic device 101. According to an embodiment, the memory 130 may store a software and/or program 140. The program 140 may, for example, include a kernel 141, a middleware 143, an application programming interface (API) 145, an application program (or "application") 147, and the like. At least some of the kernel 141, the middleware 143 or the API 145 may be called an operating system (OS). The kernel 141 may, for example, control or manage system resources (e.g., bus 110, processor 120, memory 130, and the like) that are used for executing operations or functions implemented in other programs (e.g., middleware 143, API 145 or application program 147). Also, the kernel 141 may provide an interface through which the middleware 143, the API 145 or the application program 147 may control or manage the system resources of the electronic device 101 by accessing the individual constituent element of the electronic device 101.

The middleware 143 may, for example, perform a relay role of enabling the API 145 or the application program 147 to communicate and exchange data with the kernel 141. Also, the middleware 143 may process one or more work requests that are received from the application program 147, in accordance with priority. For example, the middleware 143 may grant priority capable of using the system resources (e.g., the bus 110, the processor 120, the memory 130 or the like) of the electronic device 101 to at least one of the application programs 147, and process one or more work requests. The API 145 is, for example, an interface enabling the application program 147 to control a function provided by the kernel 141 or the middleware 143 and may, for example, include at least one interface or function (e.g., an instruction) for file control, window control, image processing, character control or the like.

The input output interface 150 may forward a command or data inputted from a user or another external device, to another constituent element(s) of the electronic device 101, or output a command or data received from the another constituent element(s) of the electronic device 101, to the user or another external device.

The display 160 may, for example, include a liquid crystal display (LCD), a light emitting diode (LED) display, an organic light emitting diode (OLED) display, a microelectromechanical systems (MEMS) display or an electronic paper display. The display 160 may, for example, display various contents (e.g., a text, an image, a video, an icon, a symbol and/or the like) to a user. The display 160 may include a touch screen. And, for example, the display 160 may receive a touch, gesture, proximity or hovering input that uses an electronic pen or a part of the user's body.

The communication interface 170 may, for example, establish communication between the electronic device 101 and an external device (e.g., the first external electronic device 102, the second external electronic device 104 or the server 106). For example, the communication interface 170 may be coupled to a network 162 through wireless communication or wired communication, to communicate with the external device (e.g., the second external electronic device 104 or the server 106).

The wireless communication may, for example, include a cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) and the like. According to an embodiment, the wireless communication may, for example, include at least one of wireless fidelity (WiFi), Bluetooth (BT), Bluetooth low energy (BLE), Zigbee, near field communication (NFC), magnetic secure transmission (MST), radio frequency (RF) or body area network (BAN). According to an embodiment, the wireless communication may include GNSS. The GNSS may, for example, be a global positioning system (GPS), a global navigation satellite system (Glonass), Beidou navigation satellite system (hereinafter, "Beidou")) or Galileo, the European global satellite-based navigation system. Hereinafter, the "GPS" may be used interchangeably with the "GNSS". The wired communication may, for example, include at least one of a universal serial bus (USB), a high definition multimedia interface (HDMI), a recommended standard-232 (RS-232), power line communication (PLC), a plain old telephone service (POTS), and the like. The network 162 may include at least one of a telecommunications network, for example, a computer network (e.g., local area network (LAN) or wide area network (WAN)), the Internet or a telephone network.

Each of the first and second electronic devices 102 and 104 may be a device of the same or different type from that of the electronic device 101. According to various embodiments, all or some of operations executed in the electronic device 101 may be executed in another one electronic device or a plurality of electronic devices (e.g., the electronic devices 102 and 104 or the server 106). According to an embodiment, where the electronic device 101 performs some function or service automatically or in response to a request, the electronic device 101 may, instead of or additionally to executing the function or service in itself, send a request for execution of at least a partial function associated with this to another device (e.g., electronic device 102, 104 or server 106). The another electronic device (e.g., electronic device 102, 104 or server 106) may execute the requested function or additional function, and forward the execution result to the electronic device 101. The electronic device 101 may process the received result as it is or additionally, to provide the requested function or service. For this, a cloud computing, distributed computing or client-server computing technology may be used, for example.

Figure 2:
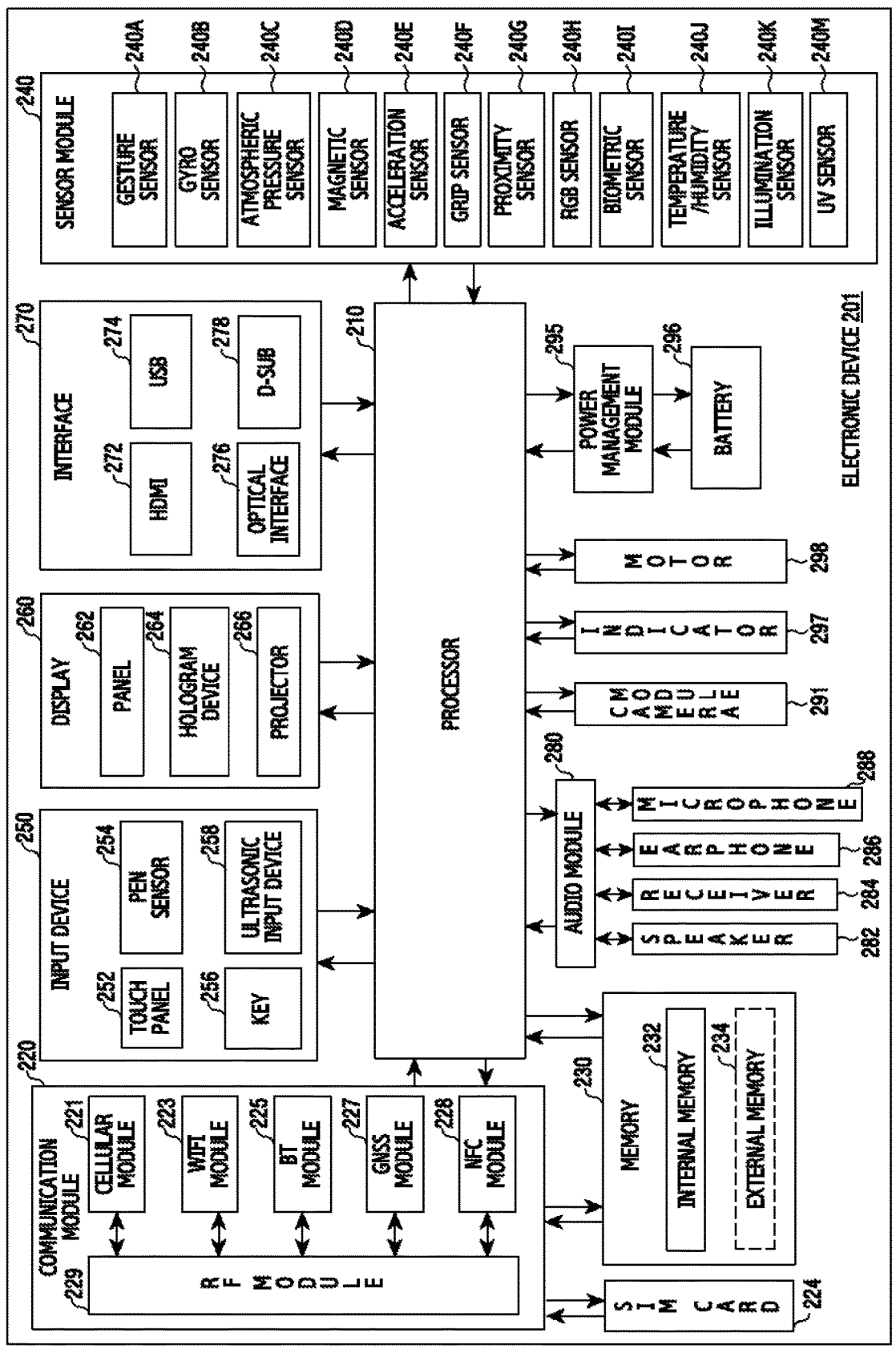
FIG. 2 is a block diagram illustrating the configuration of an electronic device according to various embodiments.

FIG. 2 illustrates a block diagram of an electronic device according to an embodiment of the present disclosure.

Referring to FIG. 2, an electronic device 201 may, for example, include the entire or part of the electronic device 101 illustrated in FIG. 1. The electronic device 201 may include one or more processors (e.g., application processor (APs)) 210, a communication module 220, a subscriber identification module 224, a memory 230, a sensor module 240, an input device 250, a display 260, an interface 270, an audio module 280, a camera module 291, a power management module 295, a battery 296, an indicator 297 and a motor 298.

The processor 210 may, for example, drive an operating system or an application program to control a majority of hardware or software constituent elements coupled to the processor 210, and may perform various data processing and operations. The processor 210 may be, for example, implemented as a system on chip (SoC). According to an embodiment, the processor 210 may further include a graphic processing unit (GPU) and/or an image signal processor (ISP). The processor 210 may include at least some (e.g., cellular module 221) of the constituent elements illustrated in FIG. 2 as well. The processor 210 may load a command or data received from at least one of the other constituent elements (e.g., non-volatile memory), to a volatile memory, to process the loaded command or data, and store the result data in the non-volatile memory.

The communication module 220 may, for example, have the same or similar construction with the communication interface 170. The communication module 220 may, for example, include a cellular module 221, a WiFi module 223, a Bluetooth module 225, a GNSS module 227, a near field communication (NFC) module 228, and a radio frequency (RF) module 229. The cellular module 221 may, for example, provide voice telephony, video telephony, a text service, an Internet service or the like through a telecommunication network. According to an embodiment, the cellular module 221 may perform the distinction and authentication of the electronic device 201 within the telecommunication network, by using the subscriber identification module (e.g., SIM card) 224. According to an embodiment, the cellular module 221 may perform at least some functions among functions that the processor 210 may provide. According to an embodiment, the cellular module 221 may include a communication processor (CP).

According to some embodiment, at least some (e.g., two or more) of the cellular module 221, the WiFi module 223, the Bluetooth module 225, the GNSS module 227 or the NFC module 228 may be included within one integrated chip (IC) or IC package. The RF module 229 may, for example, transceive a communication signal (e.g., RF signal). The RF module 229 may, for example, include a transceiver, a power amplifier module (PAM), a frequency filter, a low noise amplifier (LNA), an antenna or the like. According to another embodiment, at least one of the cellular module 221, the WiFi module 223, the Bluetooth module 225, the GNSS module 227 or the NFC module 228 may transceive an RF signal through a separate RF module. The subscriber identification module 224 may, for example, include a card including a subscriber identification module and/or an embedded SIM. And, the subscriber identification module 224 may include unique identification information (e.g., integrated circuit card identifier (ICCID)) or subscriber information (e.g., international mobile subscriber identity (IMSI)).

The memory 230 (e.g., memory 130) may, for example, include an internal memory 232 or an external memory 234. The internal memory 232 may, for example, include at least one of a volatile memory (e.g., a dynamic random access memory (DRAM), a static RAM (SRAM), a synchronous dynamic RAM (SDRAM) or the like) and a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive or a solid state drive (SSD)). The external memory 234 may include a flash drive, for example, a compact flash (CF), a secure digital (SD), a micro-SD, a mini-SD, an extreme Digital (xD), a Multi Media Card (MMC), a memory stick or the like. The external memory 234 may be operatively or physically coupled with the electronic device 201 through various interfaces.

The sensor module 240 may, for example, measure a physical quantity or sense an activation state of the electronic device 201, to convert measured or sensed information into an electrical signal. The sensor module 240 may, for example, include at least one of a gesture sensor 240A, a gyro sensor 240B, a barometer 240C, a magnetic sensor 240D, an acceleration sensor 240E, a grip sensor 240F, a proximity sensor 240G, a color sensor 240H (e.g., a red, green, blue (RGB) sensor), a biometric (medical) sensor 240I, a temperature/humidity sensor 240J, an ambient light (illuminance) sensor 240K or an ultra violet (UV) sensor 240M. Additionally or alternatively, the sensor module 240 may, for example, include an E-nose sensor, an electromyography (EMG) sensor, an electroencephalogram (EEG) sensor, an electrocardiogram (ECG) sensor, an infrared (IR) sensor, an iris scan sensor and/or a finger scan sensor. The sensor module 240 may further include a control circuit for controlling at least one or more sensors belonging therein. In some embodiment, the electronic device 201 may further include a processor configured to control the sensor module 240 as a part of the processor 210 or separately, thereby controlling the sensor module 240 while the processor 210 is in a sleep state.

The input device 250 may, for example, include a touch panel 252, a (digital) pen sensor 254, a key 256 or an ultrasonic input device 258. The touch panel 252 may, for example, use at least one scheme among a capacitive overlay scheme, a pressure sensitive scheme, an infrared beam scheme or an ultrasonic scheme. Also, the touch panel 252 may further include a control circuit as well. The touch panel 252 may further include a tactile layer, to provide a tactile response to a user. The (digital) pen sensor 254 may, for example, be a part of the touch panel 252, or include a separate sheet for recognition. The key 256 may, for example, include a physical button, an optical key or a keypad. The ultrasonic input device 258 may sense an ultrasonic wave generated in an input tool, through a microphone (e.g., microphone 288), to confirm data corresponding to the sensed ultrasonic wave.

The display 260 (e.g., the display 160) may include a panel 262, a hologram device 264, a projector 266, a display driver interface (DDI) 268, and/or a control circuit for controlling them. The panel 262 may, for example, be implemented to be flexible, transparent, or wearable. The panel 262 may be constructed as one or more modules together with the touch panel 252. The panel 262 may include a pressure sensor which may measure the strength of pressure of a user's touch. The pressure sensor may be implemented so as to be integrated with the touch panel 252 or may be implemented as one or more sensors separate from the touch panel 252.

The hologram device 264 may show a three-dimensional image to the air using an interference of light. The projector 266 may project light onto a screen, to display an image. The screen may, for example, be located inside or outside the electronic device 201. The interface 270 may, for example, include an HDMI 272, a USB 274, an optical interface 276 or a D-subminiature (D-sub) 278. The interface 270 may, for example, be included in the communication interface 170 illustrated in FIG. 1. Additionally or alternatively, the interface 270 may, for example, include a Mobile High-definition Link (MHL) interface, an SD card/Multi Media Card (MMC) interface or an Infrared Data Association (IrDA) standard interface.

The audio module 280 may, for example, convert a sound and an electrical signal interactively. At least some constituent elements of the audio module 280 may be, for example, included in the input output interface 150 illustrated in FIG. 1. The audio module 280 may for example, process sound information that is inputted or outputted through a speaker 282, a receiver 284, an earphone 286, the microphone 288 or the like. The camera module 291 is, for example, a device able to photograph a still image and a video. According to an embodiment, the camera module 291 may include one or more image sensors (e.g., front sensor or rear sensor), a lens, an image signal processor (ISP) or a flash (e.g., an LED, a xenon lamp or the like).

The power management module 295 may, for example, manage the electric power of the electronic device 201. According to an embodiment, the power management module 295 may include a power management integrated circuit (PMIC), a charger IC or a battery or fuel gauge. The PMIC may, for example, employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuit for wireless charging, for example, a coil loop, a resonance circuit, a rectifier or the like. The battery gauge may, for example, measure a level of the battery 296, a voltage being in charge, an electric current or a temperature. The battery 296 may, for example, include a rechargeable battery and/or a solar battery.

The indicator 297 may display a specific state, for example, a booting state, a message state, a charging state or the like of the electronic device 201 or a part (e.g., processor 210) of the electronic device 201. The motor 298 may convert an electrical signal into a mechanical vibration, and may generate a vibration, a haptic effect or the like. The electronic device 201 may, for example, include a mobile TV support device (e.g., GPU) capable of processing media data according to the standards of digital multimedia broadcasting (DMB), digital video broadcasting (DVB), mediaFlo™ or the like. Each of the constituent elements described in the present document may consist of one or more components, and a name of the corresponding constituent element may be varied according to the kind of the electronic device. In various embodiments, the electronic device (e.g., electronic device 201) may omit some constituent elements, or further include additional constituent elements, or combine some of the constituent elements to configure one entity, but identically perform functions of corresponding constituent elements before combination.

Figure 3:
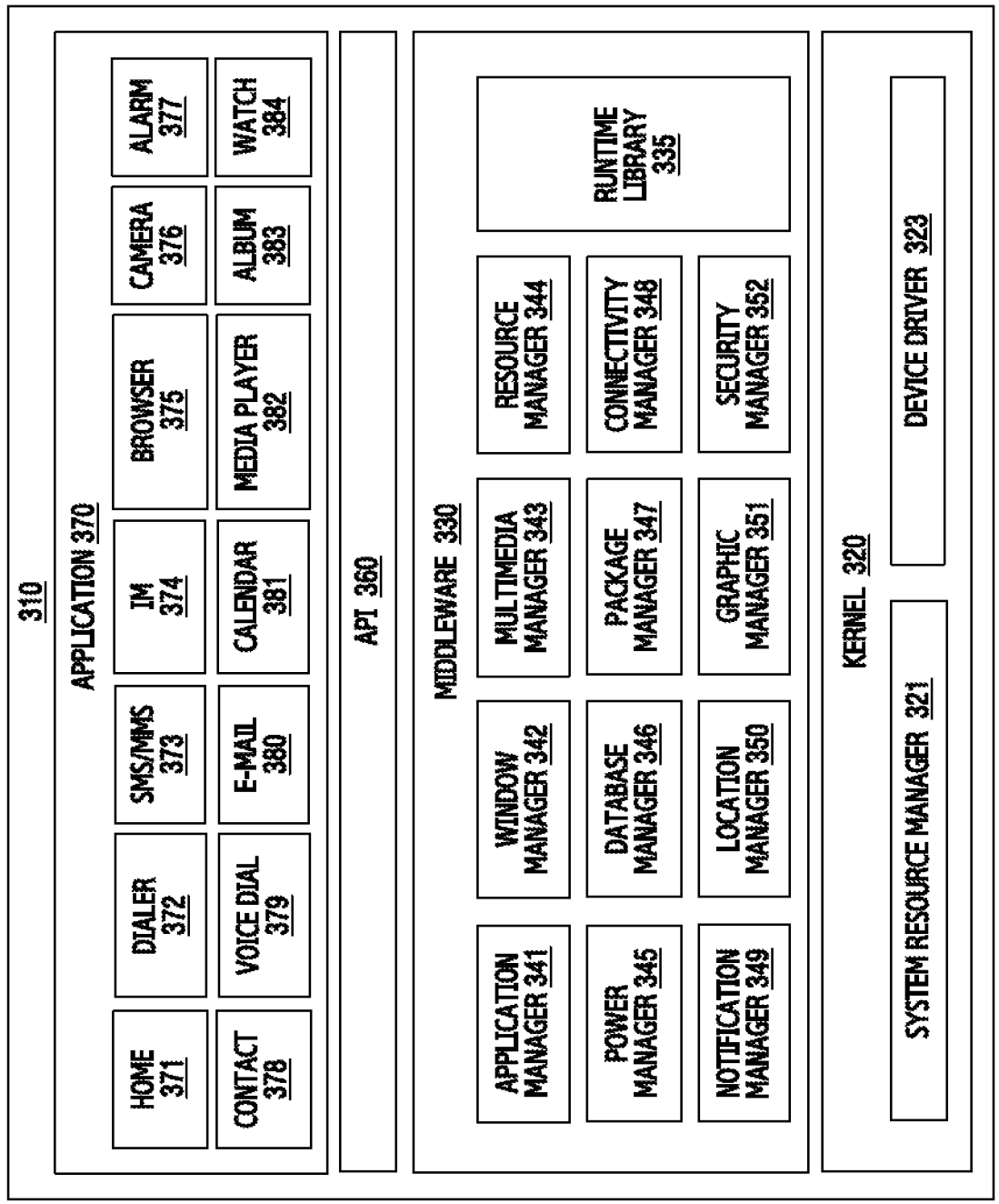
FIG. 3 is a block diagram of a program module according to various embodiments.

FIG. 3 illustrates a block diagram of a program module according to various embodiments.

According to an embodiment, the program module 310 (e.g., the program 140) may include an operating system (OS) controlling resources related to an electronic device (e.g., the electronic device 101) and/or various applications (e.g., the application program 147) run on the operating system. The operating system may, for example, include Android™, iOS™, Windows™, Symbian™, Tizen™, or Bada™. Referring to FIG. 3, the program module 310 may include a kernel 320 (e.g., the kernel 141), a middleware 330 (e.g., the middleware 143), an API 360 (e.g., the API 145), and/or an application 370 (e.g., the application program 147). At least a part of the program module 310 may be preloaded onto an electronic device, or be downloadable from an external electronic device (e.g., the electronic device 102 or 104, the server 106, etc.).

The kernel 320 may, for example, include a system resource manager 321 and/or a device driver 323. The system resource manager 321 may perform control of a system resource, allocation thereof, or recovery thereof. According to an embodiment, the system resource manager 321 may include a process management unit, a memory management unit, or a file system management unit. The device driver 323 may, for example, include a display driver, a camera driver, a Bluetooth driver, a shared memory driver, a USB driver, a keypad driver, a WiFi driver, an audio driver, or an inter-process communication (IPC) driver.

The middleware 330 may, for example, provide a function that the application 370 needs in common, or provide various functions to the application 370 through the API 360 wherein the application 370 may make use of restricted system resources within an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may, for example, include a library module that a compiler utilizes so as to add a new function through a programming language while the application 370 is executed. The runtime library 335 may perform input output management, memory management, or arithmetic function processing. The application manager 341 may, for example, manage a lifecycle of the application 370. The window manager 342 may manage a GUI resource which is used for a screen. The multimedia manager 343 may obtain a format used for playing media files, and perform encoding or decoding of the media file by using a codec suitable to the corresponding format.

The resource manager 344 may manage a source code of the application 370 or a space of a memory. The power manager 345 may, for example, manage a battery capacity, temperature or power supply, and identify or provide power information used for an operation of an electronic device by using corresponding information among this. According to an embodiment, the power manager 345 may interwork with a basic input/output system (BIOS). The database manager 346 may, for example, provide, search or change a database that will be used in the application 370. The package manager 347 may manage the installing or refining of an application that is distributed in the form of a package file.

The connectivity manager 348 may, for example, manage wireless connectivity. The notification manager 349 may, for example, provide an event such as an arrival message, an appointment, a proximity notification, etc. to a user. The location manager 350 may, for example, manage location information of an electronic device. The graphic manager 351 may, for example, manage a graphic effect that will be provided to the user, or a user interface related with this. The security manager 352 may, for example, provide system security or user authentication. According to an embodiment, the middleware 330 may include a telephony manager for managing a voice or video call function of the electronic device, or a middleware module capable of forming a combination of functions of the aforementioned constituent elements.

According to an embodiment, the middleware 330 may provide a module that is specialized by type of an operating system. The middleware 330 may dynamically delete some of the existing constituent elements, or add new constituent elements. The API 360 is, for example, a set of API programming functions, and may be provided to have another construction according to the operating system. For example, Android or iOS may provide one API set by platform, and Tizen may provide two or more API sets by platform.

The application 370 may, for example, include a home 371, a dialer 372, a short message service (SMS)/multimedia message service (MMS) 373, an instant message (IM) 374, a browser 375, a camera 376, an alarm 377, a contact 378, a voice dial 379, an electronic mail (e-mail) 380, a calendar 381, a media player 382, an album 383, a watch 384, a health care (e.g., measuring a momentum, a blood sugar or the like), or an environment information (e.g., air pressure, humidity, or temperature information) provision application. According to an embodiment, the application 370 may include an information exchange application capable of supporting information exchange between an electronic device and an external electronic device. The information exchange application may, for example, include a notification relay application for relaying specific information to the external electronic device, or a device management application for managing the external electronic device.

For example, the notification relay application may relay notification information provided in another application of the electronic device, to the external electronic device, or receive notification information from the external electronic device and provide the received notification information to a user. The device management application may, for example, install, delete, or refine a function (e.g., turned-on/turned-off of the external electronic device itself (or some components) or adjustment of a brightness (or resolution) of a display) of the external electronic device which communicates with the electronic device, or an application which operates in the external electronic device. According to an embodiment, the application 370 may include an application (e.g., a health care application of a mobile medical instrument) designated according to properties of the external electronic device. According to an embodiment, the application 370 may include an application received from the external electronic device. At least a part of the program module 310 may be implemented (e.g., executed) as software, firmware, hardware (e.g., the processor 210), or a combination of at least two or more of them, and may include a module for performing one or more functions, a program, a routine, sets of instructions or a process.

The term "module" used in the document may include a unit consisting of hardware, software or firmware, and may be, for example, used interchangeably with the term "logic", "logic block", "component", "circuitry" or the like. The "module" may be an integrally configured component or the minimum unit performing one or more functions or a part thereof. The "module" may be implemented mechanically or electronically, and may, for example, include an application-specific integrated circuit (ASIC) chip, a field-programmable gate array (FPGA) or a programmable logic device, which has been known or will be developed in future, performing some operations. At least a part of an apparatus (e.g., modules or functions thereof) or method (e.g., operations) according to various embodiments may, for example, be implemented as an instruction which is stored in a computer-readable storage medium (e.g., the memory 130) in the form of a program module. In response to the instruction being executed by a processor (e.g., the processor 120 of FIG. 1 or the processor 210 of FIG. 2), the processor may perform a function corresponding to the instruction.

An electronic device described below may be at least one of the electronic device 101 of FIG. 1 and the electronic device 201 of FIG. 2. Hereinafter, an electronic device will be described as the electronic device 101 of FIG. 1 for ease of description. However, the electronic device is not limited thereto.

Figure 4:
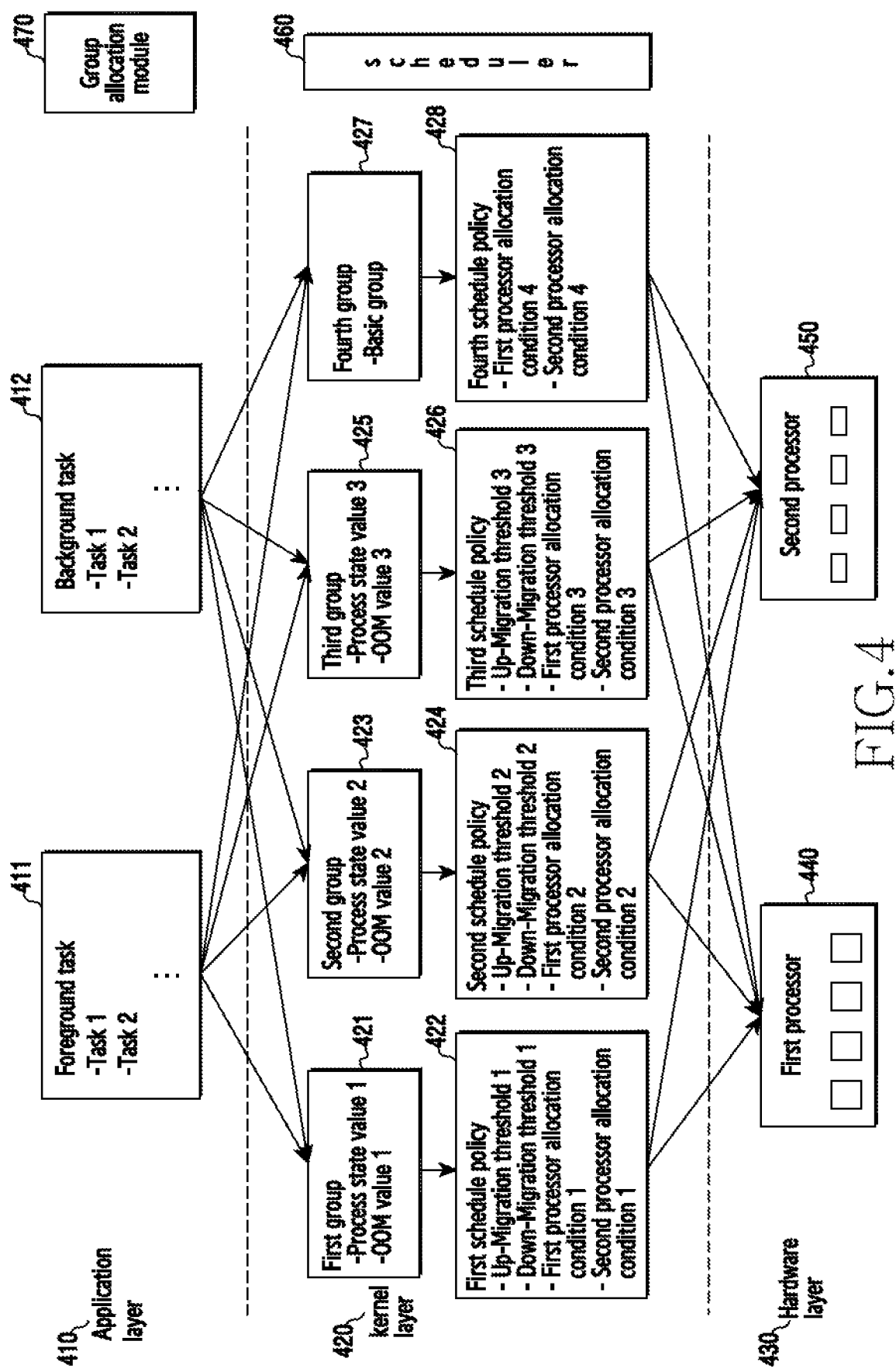
FIG. 4 is a diagram illustrating a task configuration of each layer according to various embodiments.

FIG. 4 is a diagram illustrating a task configuration of each layer according to various embodiments.

Referring to FIG. 4, the electronic device 101 may divide layers that process tasks, into an application layer 410, a kernel layer 420, and a hardware layer 430. The electronic device 101 may include a group allocation module 470 for determining a group for a task, and a scheduler 460 for controlling a schedule policy of a group in the kernel layer 420. The scheduler 460 may be included in a controller.

The application layer 410 may include an operating system for controlling resources related to the electronic device 101, and/or various applications (e.g., the application program 147) running on the operating system. The application layer 410 may include the API 360 and/or applications 370 (e.g., application programs 147) of FIG. 4. When a task is generated in the application layer 410, the group allocation module 470 may classify the generated task as a foreground task 411 or a background task 413.

For example, the foreground task 411 is a process group which is identifiable by the eyes of a user, and reacts in response to the reception of a user input, and may indicate a task displayed on the display 160 of the current electronic device 101. Also, the background task 412 is a process group which is not identifiable by the eyes of a user, and may indicate a currently executed task that is not currently displayed on the display 160 of the electronic device 101. The group allocation module 470 may classify the task as the foreground task 411 or the background task 413, based on a priority allocated to the task. The priority may be automatically allocated based on whether the task is executed in the foreground state or the background state. Alternatively, the priority may be designated by a developer of the program of the task when the program is generated.

Here, the task may indicate a job that is executed based on a predetermined program area (e.g., a code, a variable, a stack, or the like). The task may act for a user's request. For example, the task may indicate a minimum unit of scheduling in an embedded system. Also, the process may indicate that a program related to the task is uploaded in the memory 130, and is executed by the processor 120. Therefore, a process and a task are processed in different layers, but may indicate the same program executed in the electronic device 101. Hereinafter, "task" or "process" will be commonly called "task" for ease of description.

The kernel layer 420 may include one or more task groups and schedule policies related to the respective task groups (e.g., a first schedule policy 422 to a fourth schedule policy 428). Hereinafter, a group (e.g., a first group 421 to a fourth group 427) described in the description may indicate a task group. The group allocation module 470 may allocate a task included in the foreground task 411 or the background task 412 of the application layer 410 to each group of the kernel layer 420, based on the degree of user interaction.

Although it is illustrated that the group allocation module 470 is included in the application layer 410, the group allocation module 470 may be included in the application layer 410 or the kernel layer 420. The group allocation module 470 according to various embodiments may be implemented as a part of the scheduler 460. That is, the group allocation module 470 may be included in the scheduler 460.

For example, the group allocation module 470 may recognize the degree of user interaction, based on a process state value or an out-of-memory (OOM) value associated with each task. For example, the group allocation module 470 may determine that the degree of user interaction of a task is high as a process state value is low, and may determine that the degree of user interaction of a task is low as a process state value is high. Also, the group allocation module 470 may determine that the degree of user interaction of a task is high as an out-of-memory (OOM) value is low, and may determine that the degree of user interaction of a task is low as an OOM value is high.

The group allocation module 470 according to various embodiments may allocate a task, the degree of user interaction of which is determined to be high, to the first group 421, so as to process the task as fast as possible. Alternatively, the group allocation module 470 may allocate a task, the degree of user interaction of which is determined to be low, to the second group 423 to the fourth group 427. A task that is not included in the foreground task 411 or the background task 412 may be allocated to the fourth group 427. For example, a task that is not included in the foreground task 411 or the background task 412 may be a task that is not assigned with a priority. For example, the group allocation module 470 may allocate, to the fourth group 427, a task to which a priority is not allocated.

The first group 421 to the fourth group 427 may have different process state values or different OOM values. For example, process state value 1 or OOM value 1 set for the first group 421 may be lower than the process state values or OOM values of the second group 423 to the fourth group 427. Alternatively, process state value 2 or OOM value 2 set for the second group 423 may be lower than the process state values or the OOM values of the third group 425 and the fourth group 427. Also, process state value 3 or OOM value 3 set for the third group 425 may be lower than the process state value or the OOM value of the fourth group 427. Alternatively, process state value 3 or OOM value 3 set for the third group 425 may be higher than the process state value or the OOM value of the first group 421 or the second group 423. Alternatively, a process state value or an OOM value may not be set for the fourth group 427. For example, the group allocation module 470 may allocate a task to a group corresponding to a process state value or OOM value which is associated with the task. The group allocation module 470 may allocate, to the fourth group 427, a task that is not included in the first group 421 to third group 425.

The group allocation module 470 according to various embodiments may determine a group of each task, based on the degree of user interaction of a task or the number of times that a task is updated. For example, the group allocation module 470 may apply a weight to a task that is not frequently changed, such as the status bar of the electronic device 101, and a task that is frequently changed based on a user input, such as the home screen of the electronic device 101, according to the number of times that a task is updated. The group allocation module 470 may determine a group of each task, based on a weight applied to a corresponding task.

The scheduler 460 (or a controller) may control a schedule policy in a group in the kernel layer 420. The scheduler 460 may set schedule policies for the groups to be different from each other. The scheduler 460 may determine a processor that is to process a task, based on a schedule policy (e.g., the first schedule policy 422 to the fourth schedule policy 428) set for each group. For example, the first schedule policy 422 may be set for the first group 421. The first schedule policy 422 may be different from the second schedule policy 424 to the fourth schedule policy 428. For example, the first schedule policy 422 may include at least one from among up-migration threshold 1, down-migration threshold 1, first processor allocation condition 1 (e.g., big boosting), and second processor allocation condition 1. The second schedule policy 424 may be set for the second group 423.

Alternatively, the second schedule policy 424 may include at least one from among up-migration threshold 2, down-migration threshold 2, first processor allocation condition 2, and second processor allocation condition 2. The third schedule policy 426 may be set for the third group 425. The third schedule policy 426 may include at least one from among up-migration threshold 3, down-migration threshold 3, first processor allocation condition 3, and second processor allocation condition 3. The fourth schedule policy 428 may be set for the fourth group 427. The fourth schedule policy 428 may include at least one from among first processor allocation condition 4 and second processor allocation condition 4.

Migration indicates transferring a task from one operating system to another operating system. For example, migration indicates changing a subject that processes (e.g., operates, performs, controls, or the like) a task from the first processor 440 to the second processor 450, or from the second processor 450 to the first processor 440. A up-migration threshold (or selection criterion information or selection limit information) may be a threshold for a process state value or an OOM value for the migration to the first processor 440. A down-migration threshold (or selection criterion information or selection limit information) may be a threshold for a process state value or an OOM value for the migration to the second processor 450. Therefore, the up-migration threshold and the down-migration threshold may be the same as, or different from, each other. Also, the first processor allocation condition (e.g., boosting information) may be a condition (or a state) for allocation to the first processor 440, and the second processor allocation condition is a condition (or a state) for allocation to the second processor 450. The first processor allocation condition and the second processor allocation condition are the same as, or different from, each other.

According to various embodiments, the up-migration threshold 1 included in the first schedule policy 422 may be lower than the up-migration threshold 2 included in the second schedule policy 424. For example, by lowering a condition for migrating a task included in the first group 421 to the first processor 440 than a condition for migrating a task included in the second group 423 to the first processor 440, the task included in the first group 421 may be more easily migrated to the first processor 440 than the task included in the second group 423. In other words, it may be relatively difficult to migrate the task included in the second group 423 to the first processor 440, than the task included in the first group 421. Alternatively, the opposite is possible.

According to various embodiments, the down-migration threshold 1 included in the first schedule policy 422 may be higher than the down-migration threshold 2 included in the second schedule policy 424. For example, by raising a condition for migrating a task included in the first group 421 to the second processor 450 than a condition for migrating a task included in the second group 423 to the second processor 450, the task may be more easily migrated to the second processor 450 even though the task is included in the first group 421. Alternatively, the opposite is possible.

According to various embodiments, the first processor allocation condition 1 included in the first schedule policy 422 may be lower than the first processor allocation condition 2 included in the second schedule policy 424. Also, the second processor allocation condition 1 included in the first schedule policy 422 may be lower than the second processor allocation condition 2 included in the second schedule policy 424. Alternatively, the opposite is possible.

In this instance, the ratio of tasks of the first group 421 allocated to the first processor 440 may be higher than the ratio of tasks of the second group 423 allocated to the first processor 440. Also, the ratio of tasks of the second group 423 allocated to the second processor 450 may be higher than the ratio of tasks of the first group 421 allocated to the second processor 450.

Similarly, the up-migration threshold 2 included in the second schedule policy 424 may be lower than the up-migration threshold 3 included in the third schedule policy 426. For example, by lowering a condition for migrating a task included in the second group 423 to the first processor 440 than a condition for migrating a task included in the third group 425 to the first processor 440, the task included in the second group 423 may be more easily migrated to the first processor 440 than the task included in the third group

425. It may be relatively more difficult to migrate the task included in the third group 425 to the first processor 440 than the task included in the second group 423. Alternatively, the opposite is possible.

According to various embodiments, the down-migration threshold 2 included in the second schedule policy 424 may be higher than the down-migration threshold 3 included in the third schedule policy 426. For example, by raising a condition for allocating a task included in the second group 423 to the second processor 450 than a condition for allocating a task included in the third group 425 to the second processor 450, the task may be more easily migrated to the second processor 450 even though the task is included in the second group 423. Alternatively, the opposite is possible.

According to various embodiments, the first processor allocation condition 2 included in the second schedule policy 424 may be lower than the first processor allocation condition 3 included in the third schedule policy 426. Also, the second processor allocation condition 2 included in the second schedule policy 424 may be lower than the second processor allocation condition 3 included in the third schedule policy 426. Alternatively, the opposite is possible.

In this instance, the ratio of tasks of the second group 423 allocated to the first processor 440 may be higher than the ratio of tasks of the third group 425 allocated to the first processor 440. Also, the ratio of tasks of the third group 425 allocated to the second processor 450 may be higher than the ratio of tasks of the second group 423 allocated to the second processor 450.

According to various embodiments, the first processor allocation condition 3 included in the third schedule policy 426 may be lower than the first processor allocation condition 4 included in the fourth schedule policy 428. Also, the second processor allocation condition 3 included in the third schedule policy 426 may be lower than the second processor allocation condition 4 included in the fourth schedule policy 428. Alternatively, the opposite is possible. In this instance, the ratio of tasks of the third group 425 allocated to the first processor 440 may be higher than the ratio of tasks of the fourth group 427 allocated to the first processor 440. Also, the ratio of tasks of the fourth group 427 allocated to the second processor 450 may be higher than the ratio of tasks of the third group 425 allocated to the second processor 450.

Although it is illustrated that groups are classified into a total of four groups, the groups may be classified into at least two or more groups, or three or more groups.

The hardware layer 430 may include one or more processors, for example, the first processor 440 and the second processor 450. The electronic device 101 may be implemented as a heterogeneous multi-core processor which includes at least two different types of cores. The multi-core processor may include different processors from among, for example, X86, X64, advanced RISC machine (ARM), graphic processing unit (GPU), and digital signal processor (DSP). The first processor 440 and the second processor 450 may be distinguished based on the performance or the power of a processor. For example, the first processor 440 may be a high-performance processor and the second processor 450 may be a low-performance processor. The high-performance processor has a fast processing speed and thus, a task having a high importance may have a high probability of being allocated to the first processor 440. While the high-performance processor operates, the temperature of the electronic device 101 increases or the amount of charge in the battery consumed by the electronic device 101 may be large. Therefore, the scheduler 460 may perform a control such that the minimum amount of tasks is processed by the first processor 440 and the rest of the tasks may be processed by the second processor 450.

For example, the first processor 440 and the second processor 450 may be implemented as any one from among a dual-core, a triple-core, a quad-core, a hexa-core, and an octa-core (e.g., a high-performance big core (e.g., Cotex-A15 or the like) or a low-power little core (e.g., Cortex-A7 or the like)). Although FIG. 4 illustrates that the first processor 440 and the second processor 450 are as a octa-core, the sum of which is 8, this is not limited thereto. The first processor 440 or the second processor 450 may process a task allocated by the scheduler 460.

In the drawing, a description will be provided from the perspective of two processors, such as a high-performance processor and a lower-performance processor, but the present disclosure is not limited by the drawing.

An electronic device according to various embodiments may include a high-performance processor (e.g., a first processor), a low-performance processor (e.g., a second processor), and a medium-performance processor (e.g., a third processor) that shows a performance that is lower (or poorer) than the high-performance processor and is higher (better) than the low-performance processor, which are classified into three types of processors. Alternatively, the electronic device may include a high-performance processor, a low-performance processor, and a processor (e.g., a third processor) that shows performance higher (or better) than the high-performance processor, which are classified into three types of processors. Alternatively, the electronic device may include a high-performance processor, a low-performance processor, and a processor (e.g., a third processor) that shows performance lower (or poorer) than the low-performance processor, which are classified into three types of processors. When the electronic device includes three types of processors, group determination and a schedule policy of each group may be changed. That is a simple change in a design, and the present disclosure may not be limited by the description provided below.

An electronic device according to various embodiments may include a memory, a first processor, a second processor having an attribute different from that of the first processor, and a controller, wherein the controller is configured to: identify a task loaded in the memory; select a processor to execute the task from among the first processor and the second processor, based on attribute information corresponding to a user interaction related to the task; and allocate the task to the selected processor.

The memory stores a first schedule policy corresponding to a first group and a second schedule policy corresponding to a second group, the electronic device further includes a group allocation module configured to determine a group corresponding to the task from among the first group and the second group, based at least on the attribute information, and the controller is configured to: identify a schedule policy corresponding to the determined group; and select the processor, based at least on the identified schedule policy.

The group allocation module is configured to determine a group corresponding to the task from among the first group and the second group, based at least on changed attribute information of the task when the attribute information is changed, and the controller is configured to: identify a schedule attribute corresponding to the determined group; and select the processor, based at least on the identified schedule policy.

The controller is configured to change the first schedule policy or the second schedule policy, based at least on state information of the electronic device.

The state information is configured to include at least one from among load information of the first processor or the second processor, temperature information of the electronic device, power state information of the electronic device, and user input state information of the electronic device.

The first schedule policy or the second schedule policy is configured to include at least one from among selection criterion information corresponding to the first processor or the second processor, selection limit information, and boosting information.

The controller is configured to change a schedule policy such that a task processed in the first processor is migrated to the second processor, or a task processed in the second processor is migrated to the first processor, based on the attribute information of the task.

The attribute information is configured to include at least one from among process state information and out-of-memory (OOM) information.

The controller is configured to set a schedule policy to migrate a task having a high set value included in the process state information or the OOM information from the first processor to the second processor, based at least on the state information of the electronic device.

The controller is configured to set a schedule policy to migrate a task having a low set value included in the process state information or the OOM information from the second processor to the first processor, based at least on the state information of the electronic device.

The electronic device may further include: a monitoring module configured to monitor the user interaction; and a group allocation module configured to dynamically change attribute information of the task based on a result of monitoring performed by the monitoring module.

The controller is configured to: set a schedule policy of each group to be different from each other; and allocate the task to the first processor or the second processor, based on a schedule policy allocated to each group.

Figure 5:
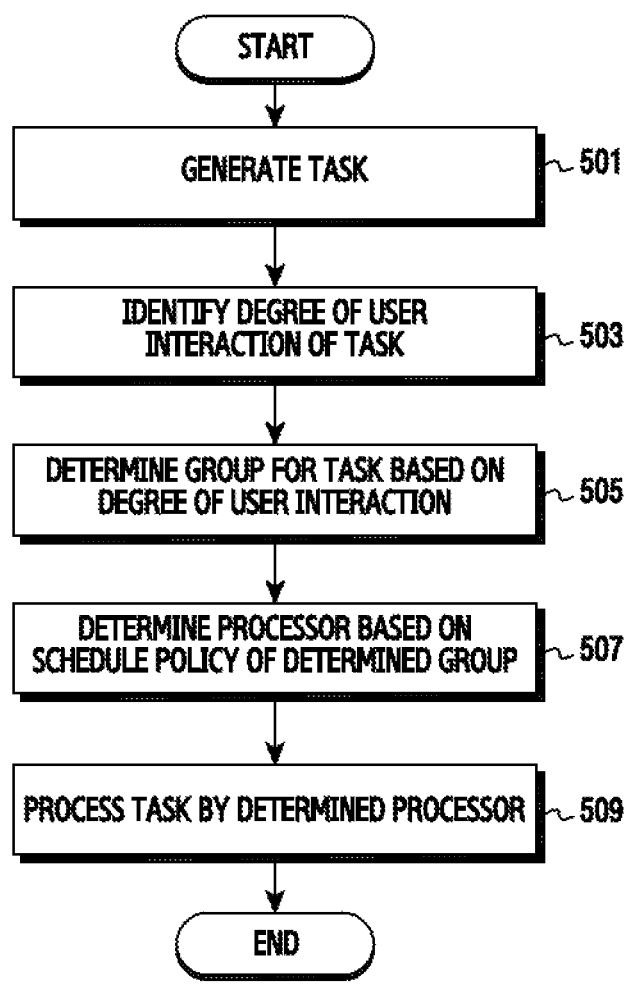
FIG. 5 is a flowchart illustrating an operation method of an electronic device according to various embodiments.

FIG. 5 is a flowchart illustrating an operation method of an electronic device according to various embodiments.

Referring to FIG. 5, in operation 501, the electronic device 101 may generate a task. For example, upon a user input or the execution of a program for driving the electronic device 101, a task may be generated. The generated task may be included in the application layer 410 of FIG. 4. When the task is generated, a process state value or an OOM value may be set for the task. In this instance, the process state value or the OOM value may be changed based on the state of the task or the state of the electronic device 101.

The group allocation module 470 according to various embodiments may classify the generated task as the foreground task 411 or the background task 413. For example, the group allocation module 470 may classify the task as the foreground task 411 or the background task 413, based on a priority allocated to the task. For example, the middleware 143 may assign a priority to use the system resources (e.g., the bus 110, the processor 120, the memory 130, or the like) of the electronic device 101 to at least one of the application programs 147. Alternatively, the priority may be designated by a developer of the program of the task when the program is generated.

In operation 503, the electronic device 101 (e.g., the group allocation module 470) may identify the degree of user interaction of the task. For example, the scheduler 460 (or controller) may identify the degree of user interaction, based on a process state value or OOM value associated with the task. The group allocation module 470 may identify, as the degree of user interaction, a process state value or an OOM value set for the task when the task is generated.

TABLE 1

| Process State | TAG | Value | Description |
| --- | --- | --- | --- |
| PROCESS_STATE_PERSISTENT | N | 0 | Process is persistent system process. |
| PROCESS_STATE_PERSISTENT_UI | P | 1 | Process is a persistent system process and is doing UI. |
| PROCESS_STATE_TOP | T | 2 | Process is hosting the current top activities. Note that this covers all activities that are visible to the user. |
| PROCESS_STATE_IMPORTANT_FORGROUND | IF | 3 | Process is important to the user, and something they are aware of. |
| PROCESS_STATE_IMPORTANT_BACKGROUND | IB | 4 | Process is important to the user, but not something they are aware of. |
| PROCESS_STATE_BACKUP | BU | 5 | Process is in the background running a backup/restore operation. |
| PROCESS_STATE_HEAVY_WEIGHT | HW | 6 | Process is in the background, but it can't restore its state so we want to try to avoid killing it. |
| PROCESS_STATE_SERVICE | S | 7 | Process is in the background running a service. Unlike oom_adj, this level is used for both the normal running in background state and the executing operations state. |
| PROCESS_STATE_RECIEVER | R | 8 | Process is in the background running a receiver. Note that from the perspective of oom_adj receivers run at a higher foreground level, but for our prioritization here that is not necessory and putting them below services means many fewer changes in some process states as they receive broadcasts. |
| PROCESS_STATE_HOME | HO | 9 | Process is in the background but hosts the home activity. |
| PROCESS_STATE_LAST_ACTIVITY | LA | 10 | Process is in the background but hosts the last shown activity. |

TABLE 1-continued

| Process State | TAG | Value | Description |
|---|---|---|---|
| PROCESS_STATE_CACHED_ACTIVITY | CA | 11 | Process is being cached for later use and contains activities. |
| PROCESS_STATE_ACTIVITY_CLIENT | Ca | 12 | Process is being cached for later use and is a client of another cached process that contains activities. |
| PROCESS_STATE_EMPTY | CE | 13 | Process is being cached for later use and is empty. |

Table 1 indicates a process state value. The process state value may be a value used for managing the state of a processor, and for distinguishing a task related to a user experience (UX) or a user interface (UI), such as foreground state, a persistent state, a backup state, or the like. A process may have one of the process state values, and the value may be changed as the operation performed by the process is changed. The group allocation module 470 may determine that a process (e.g., a task) more directly interacts with a user as the process has a smaller process state value.

TABLE 2

| adj type | TAG | Value |
|---|---|---|
| NATIVE_ADJ | ntv | −17 |
| SYSTEM_ADJ | sys | −16 |
| PERSISTENT_PROC_ADJ | pers | −12 |
| PERSISTENT_SERVICE_ADJ | psvc | −11 |
| FOREGROUND_APP_ADJ | fore | 0 |
| VISIBLE_APP_ADJ | vis | 1 |
| PERCEPTIBLE_APP_ADJ | prep | 2 |
| HEAVY_WEIGHT_APP_ADJ | hkup | 3 |
| BACKUP_APP_ADJ | hvy | 4 |
| SERVICE_ADJ | svc | 5 |
| HOME_APP_ADJ | home | 6 |
| PREVIOUS_APP_ADJ | prev | 7 |
| SERVICE_B_ADJ | svcb | 8 |
| CACHED_APP_MIN_ADJ | cch | 9 |
| CACHED_APP_MAX_ADJ | cch | 15 |
| UNKNOWN_ADJ | cch | 167 |

Table 2 indicates an out-of-memory (OOM) value. The OOM value may be a priority value used by a memory manager (low memory killer (LMK)) when a memory is insufficient, so as to delete process information (e.g., information for processing a task) loaded in the memory. For example, as the OOM value has a low value, the importance of the task is high. There is a low probability that process information loaded in the memory is deleted by the memory manager. Conversely, as the OOM value has a high value, the importance of the task is low. There is a high probability that process information loaded in the memory is deleted by the memory manager. That is, the group allocation module 470 may identify the importance of a task, based on the OOM value. The OOM value may be set by a kernel. Also, the OOM value may be changed as the importance is changed based on a process situation.

In operation 505, the electronic device 101 (e.g., the group allocation module 470) may determine a group for the task, based on the identified degree of user interaction of the task. Referring to Table 1 and Table 2, the group allocation module 470 may determine, as the first group 421, a task of which the process state value is less than or equal to PROCESS_STATE_IMPORTANT_BACKGROUND(IB, 4) (e.g., a value in the range of 0 to 4) or a task of which the OOM value is less than or equal to VISIBLE_APP_ADJ(vis, 1) (e.g., a value in the range of −17 to 1) from among tasks classified as the foreground task 411. For example, the first group 421 is a group of tasks that are closely related to user experience. Since the importance of the tasks is high, the first schedule policy 422 may be set for the first group 421 such that the tasks are processed as promptly as possible. For example, a task included in the first group 421 may be a rendering process that draws a user interface.

Referring to Table 1 and Table 2, the group allocation module 470 may determine, as the second group 423, a task of which the process state value is less than or equal to PROCESS_STATE_BACKUP(BU, 5) (e.g., a value in the range of 0 to 5) or a task of which the OOM value is less than or equal to PERCEPTIBLE_APP_ADJ(prcp, 2) (e.g., a value in the range of −17 to 2) from among tasks classified as the foreground task 411. For example, the second group 423 may be a task group that is relatively less related to user experience. In other words, since the task is less closely related to user experience even though the task is included in the foreground task 411, the task may be processed by lowering the importance of the task. For example, although the task is included in the foreground task 411, the task may be in the form of a service, and may have a background characteristic. That is, the task included in the second group 423 may be a download process, a resource preload process, or the like which does not affect user experience.

Referring to Table 1 and Table 2, the group allocation module 470 may determine, as the third group 425, a task of which the process state value is less than or equal to PROCESS_STATE_IMPORTANT_BACKGROUND(IB, 4) (e.g., a value in the range of 0 to 4) or a task of which the OOM value is less than or equal to VISIBLE_APP_ADJ(vis, 1) (e.g., a value in the range of −17 to 1) from among tasks classified as the background task 412. For example, the third group 425 may be a task group that is closely related to user experience from among tasks classified as the background task 412. A task included in the third group 425 may be a touch process, a display process, or the like.

According to various embodiments, the group allocation module 470 may determine, as the first group 421, a task of which the process state value is less than or equal to PROCESS_STATE_IMPORTANT_BACKGROUND(IB, 4) (e.g., a value in the range of 0 to 4) or a task of which the OOM value is less than or equal to VISIBLE_APP_ADJ(vis, 1) (e.g., a value in the range of −17 to 1) from among tasks classified as the background task 412. The task included in the first group 421 may be a group of processes that need to be importantly and quickly processed even though the task is classified as the background task 412.

The scheduler 460 may allocate, to the fourth group 427, a task that is not allocated to the first group 421 to third group 425. The fourth group 427 may be defined as a basic group, and may process a task according to a basic scheduling policy.

In operation 507, the electronic device 101 (e.g., the scheduler 460) may determine a processor, based on the schedule policy of the determined group. For example, when the determined group is the first group 421, the scheduler 460 may determine a processor that is to process a task, based on the first schedule policy 422. When the determined group is the second group 423, the scheduler 460 may determine a processor that is to process a task, based on the second schedule policy 424.

When the determined group is the third group 425, the scheduler 460 may determine a processor that is to process a task, based on the third schedule policy 426. When the determined group is the fourth group 427, the scheduler 460 may determine a processor that is to process a task, based on the fourth schedule policy 428. For example, the ratio of tasks of the first group 421 allocated to the first processor 440 may be higher than the ratio of tasks of the second to fourth groups 423 to 427 allocated to the first processor 440. Also, the ratio of tasks of the second to fourth groups 423 to 427 allocated to the second processor 450 may be higher than the ratio of tasks of the first group 421 allocated to the second processor 450.

In operation 509, the electronic device 101 (e.g., the scheduler 460) may perform a control such that the task is processed by the determined processor. For example, when the determined processor is the first processor 440, the first processor 440 may process the generated task. Alternatively, when the determined processor is the second processor 450, the second processor 450 may process the generated task.

Figure 6A:
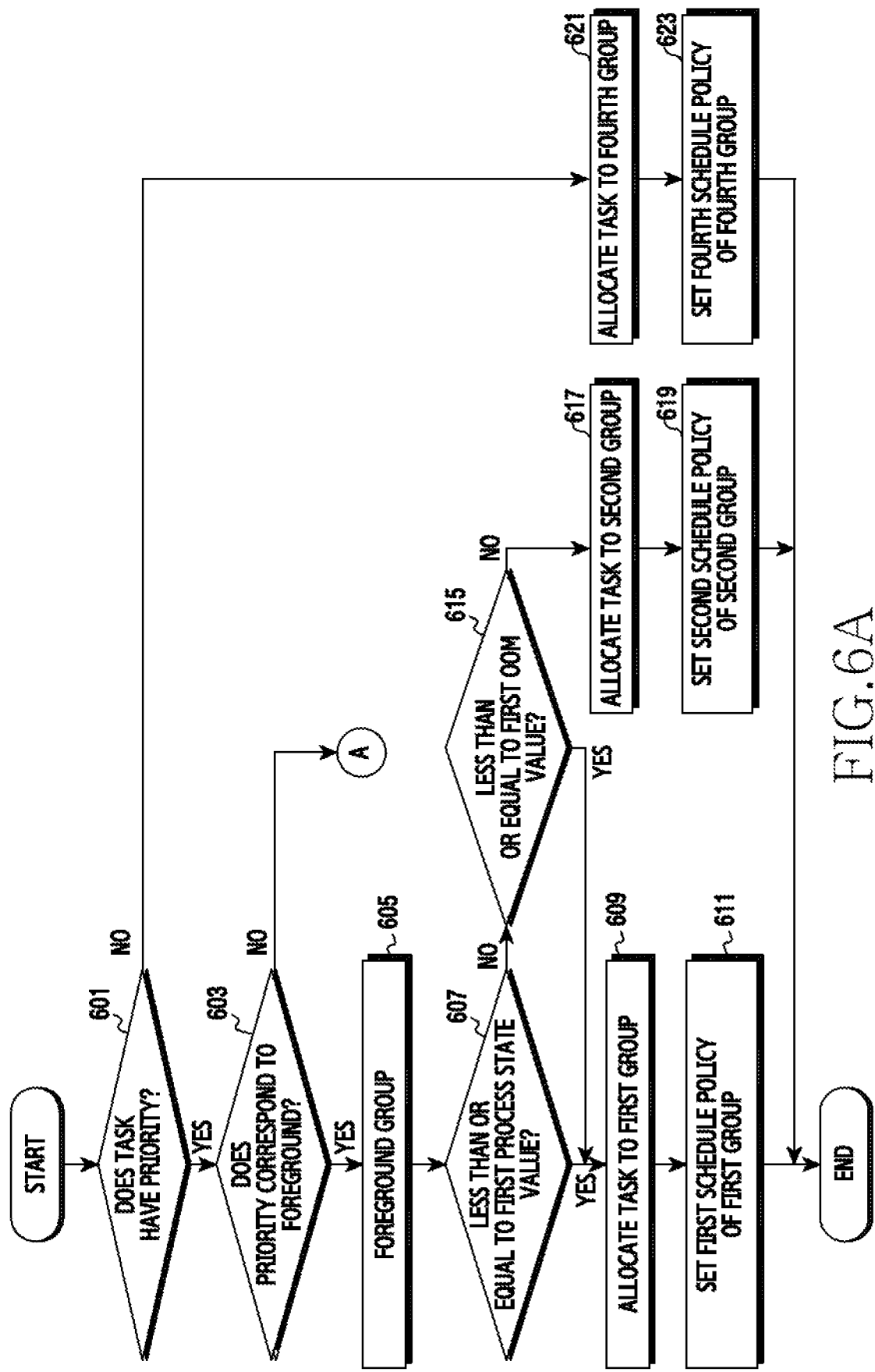
FIGS. 6A and 6B are flowcharts illustrating a task group allocating method of an electronic device according to various embodiments.
Figure 6B:
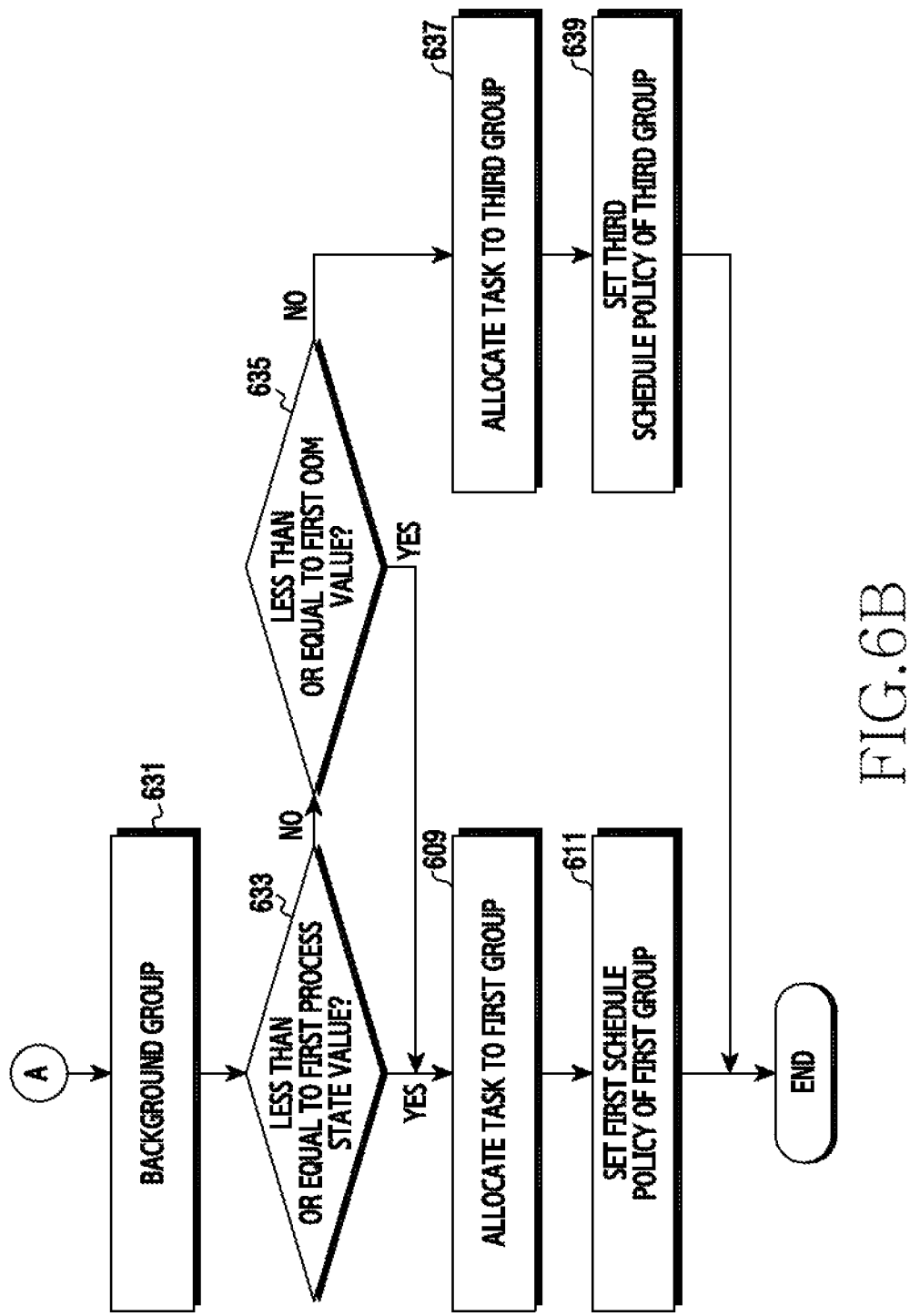

FIGS. 6A and 6B are flowcharts illustrating a task group allocating method of an electronic device according to various embodiments.

FIGS. 6A and 6B illustrate operations 503 and 505 in detail when operation 501 of FIG. 5 is performed or after operation 501 is performed.

Referring to FIG. 6A, in operation 601, the electronic device 101 (e.g., the group allocation module 470) may determine whether a task has a priority. The middleware 143 of the electronic device 101 may assign the priority based on whether the task is executed in the foreground state or background state. Alternatively, the priority may be designated by a developer of the program of the task when the program is generated.

When the priority exists, the group allocation module 470 may perform operation 603. Otherwise, the group allocation module 470 may perform operation 621.

When the priority exists, the electronic device 101 (e.g., the group allocation module 470) may determine whether the priority corresponds to the foreground in operation 603. As described in the above description, the group allocation module 470 may determine whether the task corresponds to the foreground or the background, using the priority. That is, the value of the priority may be different based on whether the task is in the foreground or the background. For example, when the task is in the foreground, the priority of the task may be 1. When the task is in the background, the priority of the task may be 0. Conversely, when the task is in the foreground, the priority of the task may be 0. When the task is in the background, the priority of the task may be 1. Alternatively, when the task is in the foreground, the priority of the task may have a value of 5 or more. When the task is in the background, the priority of the task may have a value less than 5. Those are merely examples for helping to understand the present disclosure, a priority value is not limited thereto.

When the priority corresponds to the foreground, the group allocation module 470 may perform operation 605. Otherwise, the group allocation module 470 may perform A (e.g., operation 631 of FIG. 6A). When the priority does not correspond to the foreground, the priority of the task may correspond to the background.

In operation 605, the electronic device 101 (e.g., the group allocation module 470) may include the task in a foreground group. The foreground group may be a group of tasks corresponding to the foreground task 411.

In operation 607, the electronic device 101 (e.g., the group allocation module 470) may determine whether the process state value of the task is less than or equal to the first process state value. The first process state value may be the process state value set for the first group 421. As described above with reference to FIG. 1, the group allocation module 470 may determine whether the process state value of the task is less than or equal to PROCESS_STATE_IMPORTANT_BACKGROUND(IB, 4).

When the process state value of the task is less than or equal to the first process state value, the group allocation module 470 may perform operation 609. When the process state value of the task exceeds the first process state value, the group allocation module 470 may perform operation 615. For example, with reference to FIG. 1, when the process state value of the task is less than or equal to "4" (e.g., 0 to 4), the group allocation module 470 may perform operation 609. When the process state value of the task exceeds "4" (e.g., 5 to 13), the group allocation module 470 may perform operation 615.

In operation 609, the electronic device 101 (e.g., the group allocation module 470) may allocate the task to the first group 421. The ratio of tasks of the first group 421 allocated to the first processor 440 may be higher than the ratio of tasks of the second to fourth groups 423 to 427 allocated to the first processor 440. For example, process state value 1 or OOM value 1 set for the first group 421 may be lower than the process state values or OOM values of the second group 423 to the fourth group 427. As a process state value or an OOM value is low, the ratio of tasks of a corresponding group allocated to the first processor 440 may be high.

In operation 611, the electronic device 101 (e.g., the scheduler 460) may set the first schedule policy 422 of the first group 421. For example, the first schedule policy 422 may include at least one from among up-migration threshold 1, down-migration threshold 1, first processor allocation condition 1, and second processor allocation condition 1.

The scheduler 460 according to various embodiments may set the up-migration threshold 1 of the first schedule policy 422 to be lower than other schedule policies (e.g., the second schedule policy 424 to the fourth schedule policy 428) such that a task is easily migrated to the first processor 440 even when a little bit of load occurs in the task. Also, the scheduler 460 may lower the down-migration threshold 1 of the first schedule policy 422 so as to prevent the migration to the second processor 450 when a little bit of load occurs in the first processor 440 although the first processor 440 currently processes a task.

Also, the scheduler 460 may set the first processor allocation condition 1 such that a task having a high degree of user interaction to the first processor 440, for example, every time that a touch input is provided. Alternatively, the scheduler 460 may set the first processor allocation condition 1 such that a task operates only in the first processor 440 during a predetermined period of time (e.g., hundreds of ms) when a touch input is provided. Alternatively, when the number of tasks processed by the first processor 440 is greater than or equal to a predetermined number, the scheduler 460 may set the second processor allocation condition 1 such that one task or one or more tasks are allocated to the second processor 450.

Through the above, a larger number of tasks of the first group 421 may be allocated to the first processor 440 than the number of tasks of other groups (e.g., the second group 423 to the fourth group 427) allocated to the first processor 440. The tasks in the first group 421 have importance higher than those of other groups. That fact that the importance of a task is high indicates that the degree of user interaction of the task is high, and the task needs to be processed as quickly as possible.

When the process state value of the task exceeds the first process state value, the electronic device 101 (e.g., the group allocation module 470) may determine whether the OOM value related to the task is less than or equal to a first OOM value in operation 615. The first OOM value may be the OOM value set for the first group 421. As described with reference to FIG. 2, the group allocation module 470 may determine whether the OOM value of the task is less than or equal to VISIBLE_APP_ADJ(vis, 1).

When the OOM value of the task is less than or equal to the first OOM value, the group allocation module 470 may perform operation 609. When the OOM value of the task exceeds the first OOM value, the group allocation module 470 may perform operation 617. For example, with reference to FIG. 2, when the OOM value of the task is less than or equal to "1" (e.g., −17 to 1), the group allocation module 470 may perform operation 609. When the OOM value of the task exceeds "1" (e.g., 2 to 167), the group allocation module 470 may perform operation 617. That is, when the OOM value of the task is less than or equal to the first OOM value even though the process state value of the task exceeds the first process state value, the group allocation module 470 may allocate the task to the first group 421.

When the OOM value of the task exceeds the first OOM value, the electronic device 101 (e.g., the group allocation module 470) may allocate the task to the second group 423 in operation 617. For example, when the process state value of the task exceeds the first process state value and the OOM value of the task exceeds the first OOM value, the group allocation module 470 may allocate the task to the second group 423. In the case of the second group 423, the importance of tasks may be lower than those of the first group 421. When the importance of a task is low, the degree of user interaction may be low. For example, the ratio of tasks of the second group 423 allocated to the first processor 440 may be lower than that of the first group 421, but may be higher than those of the third group 425 and the fourth group 427. Also, the process state value 2 or the OOM value 2 set for the second group 423 may be higher than the process state value 1 or the OOM value 1 set for the first group 421, but may be lower than the process state values or OOM value sets for the third group 425 and the fourth group 427.

In operation 619, the electronic device 101 (e.g., the scheduler 460) may set the second schedule policy 424 of the second group 423. For example, the second schedule policy 424 may include at least one from among up-migration threshold 2, down-migration threshold 2, first processor allocation condition 2, and second processor allocation condition 2.

Since a task is a process that is not closely related to user experience although the task is included in the foreground group, the scheduler 460 according to various embodiments may set the up-migration threshold 2 or the down-migration threshold 2 of the second schedule policy 424, using the same or similar criterion used for the third group 425 or the fourth group 427.

The scheduler 460 according to various embodiments may set the first processor allocation condition 2 or the second processor allocation condition 2 such that a fewer number of tasks of the second group 423 are allocated to the first processor 440 than the number of tasks of the first group 421 allocated to the first processor 440. Alternatively, the scheduler 460 may set the first processor allocation condition 2 or the second processor allocation condition 2 such that migration from the first processor 440 to the second processor 450 starts from tasks included in the second group 423 to the fourth group 427, based on load information of the first processor 440 or the second processor 450 (e.g., the number of tasks in a processor is greater than or equal to a predetermined number). Alternatively, the scheduler 460 may set the first processor allocation condition 2 or the second processor allocation condition 2 such that migration from the first processor 440 to the second processor 450 starts from tasks included in the second group 423 to the fourth group 427, based on temperature information of the electronic device 101 (e.g., the temperature of the electronic device 101 is greater than or equal to a predetermined temperature). Alternatively, the scheduler 460 may set the first processor allocation condition 2 or the second processor allocation condition 2 such that migration from the first processor 440 to the second processor 450 starts from tasks included in the second group 423 to the fourth group 427, based on power state information of the electronic device 101 (e.g., a battery level is less than a predetermined level).

According to various embodiments, the second schedule policy 424 may have a up-migration threshold, a down-migration threshold, a first processor allocation condition, and a second processor allocation condition, which are lower than those of the third schedule policy 426 and the fourth schedule policy 428. Through the above, a larger number of tasks of the second group 423 may be allocated to the first processor 440 than the number of tasks of other groups (e.g., the third group 425 to the fourth group 427) allocated to the first processor 440. The importance of the tasks in the second group 423 is higher than those of the third group 425 and the fourth group 427. That fact that the importance of a task is high indicates that the degree of user interaction of the task is high, and the task needs to be processed as quickly as possible.

When priority does not exist, the electronic device 101 (e.g., the group allocation module 470) may allocate the task to the fourth group 427 in operation 621. The fourth group 427 may be a group to which a task that does not belong to the foreground group or the background group is allocated.

In operation 623, the electronic device 101 (e.g., the scheduler 460) may set the fourth schedule policy 428 of the fourth group 427. The fourth schedule policy 428 may include first processor allocation condition 4 or second processor allocation condition 4. The scheduler 460 may set the first processor allocation condition 4 or the second processor allocation condition 4 of the fourth schedule policy 428 such that tasks included in the fourth group 427 are processed by the second process 450 as far as possible.

Referring to FIG. 6B, the electronic device 101 (e.g., the group allocation module 470) may include the task in the background group in operation 631. The background group may be a group of tasks corresponding to the background task 412.

In operation 633, the electronic device 101 (e.g., the group allocation module 470) may determine whether the process state value of the task is less than or equal to a first process state value.

When the process state value of the task is less than or equal to the first process state value, the group allocation module 470 may perform operation 609. When the process state value of the task exceeds the first process state value, the group allocation module 470 may perform operation 635. When the process state value of the task is less than or equal to the first process state value, the group allocation module 470 may perform operation 609 and may allocate the task to the first group 421.

When a task is a process that is closely related to user experience even though the task is included in the background group, the group allocation module 470 according to various embodiments may allocate the task to the first group 421. That is, when a task included in the background group is, for example, a touch process, the task is closely related to user experience, the importance of the task may be high. In this instance, the group allocation module 470 may allocate the task to the first group 421. When the task is allocated to the first group 421, the scheduler 460 may allocate the task to a processor, based on the first schedule policy 422 of the first group 421.

When the process state value of the task exceeds the first process state value, the electronic device 101 (e.g., the group allocation module 470) may determine whether the OOM value related to the task is less than or equal to a first OOM value in operation 635.

When the OOM value of the task is less than or equal to the first OOM value, the group allocation module 470 may perform operation 609. When the OOM value of the task exceeds the first OOM value, the group allocation module 470 may perform operation 637. That is, when the OOM value of the task is less than or equal to the first OOM value even though the process state value of the task exceeds the first process state value, the group allocation module 470 may allocate the task to the first group 421.

Alternatively, when the OOM value of the task is less than or equal to the first OOM value, the group allocation module 470 may perform operation 617, and may allocate the task to the second group 423. That is a simple change in a design, and a group allocation operation is not limited thereto.

When the OOM value of the task exceeds the first OOM value, the electronic device 101 (e.g., the group allocation module 470) may allocate the task to the third group 425 in operation 637. For example, when the process state value of the task included in the foreground group exceeds the first process state value and the OOM value of the task exceeds the first OOM value, the group allocation module 470 may allocate the task to the third group 425. In the case of the third group 423, the importance of tasks may be lower than those of the first group 421 and the second group 423. When the importance of a task is low, the degree of user interaction may be low. For example, the ratio of tasks of the third group 425 allocated to the first processor 440 may be lower than those of the first group 421 and the second group 423. Also, process state value 3 or OOM value 3 set for the third group 425 may be higher than the process state value or the OOM value of the first group 421 or the second group 423.

In operation 639, the electronic device 101 (e.g., the scheduler 460) may set the third schedule policy 426 of the third group 425 such that a task is allocated to the second processor 450. For example, the third schedule policy 426 may include at least one from among up-migration threshold 3, down-migration threshold 3, first processor allocation condition 3, and second processor allocation condition 3.

Since a task is a process that is not closely related to user experience although the task is included in the background group, the scheduler 460 according to various embodiments may set the up-migration threshold 3 or the down-migration threshold 3 of the third schedule policy 426, using the same or similar criterion used for the second group 423 or the fourth group 427. According to various embodiments, the third schedule policy 426 may have a up-migration threshold, a down-migration threshold, a first processor allocation condition, and a second processor allocation condition, which are lower than those of the fourth schedule policy 428.

The scheduler 460 according to various embodiments may set the first processor allocation condition 2 or the second processor allocation condition 2 such that a fewer number of tasks of the third group 425 are allocated to the first processor 440 than the number of tasks of the second group 423 allocated to the first processor 440. Alternatively, when the first processor 440 is busy (e.g., load information), the scheduler 460 may set the first processor allocation condition 3 or the second processor allocation condition 3 such that migration to the second processor 450 starts from tasks included in the third group 425 and the fourth group 427. Alternatively, the scheduler 460 may set the first processor allocation condition 3 or the second processor allocation condition 3 such that migration to the second processor 450 starts from tasks included in the third group 425 and the fourth group 427 when the heat generated in the electronic device 101 (e.g., temperature information) is serious (e.g., the temperature of the electronic device 101 is greater than or equal to a predetermined temperature). Alternatively, the scheduler 460 may set the first processor allocation condition 3 or the second processor allocation condition 3 such that migration to the second processor 450 starts from tasks included in the third group 425 and the fourth group 427 when the amount of charge in the battery of the electronic device 101 (e.g., power state information) is insufficient (e.g., a battery level is greater than or equal to a predetermined level).

When a large number of tasks are processed by the first processor 440, the scheduler 460 according to various embodiments may change the first schedule policy 422 to the fourth schedule policy 428, based on the state of the electronic device 101 (e.g., the load of a processor, the temperature of an electronic device, the power of an electronic device, or the like). As the first schedule policy 422 to the fourth schedule policy 428 are changed, some of the tasks that are currently processed by the first processor 440 may be migrated to the second processor 450 and thus, the number of tasks processed by the first processor 440 may be reduced.

Figure 7:
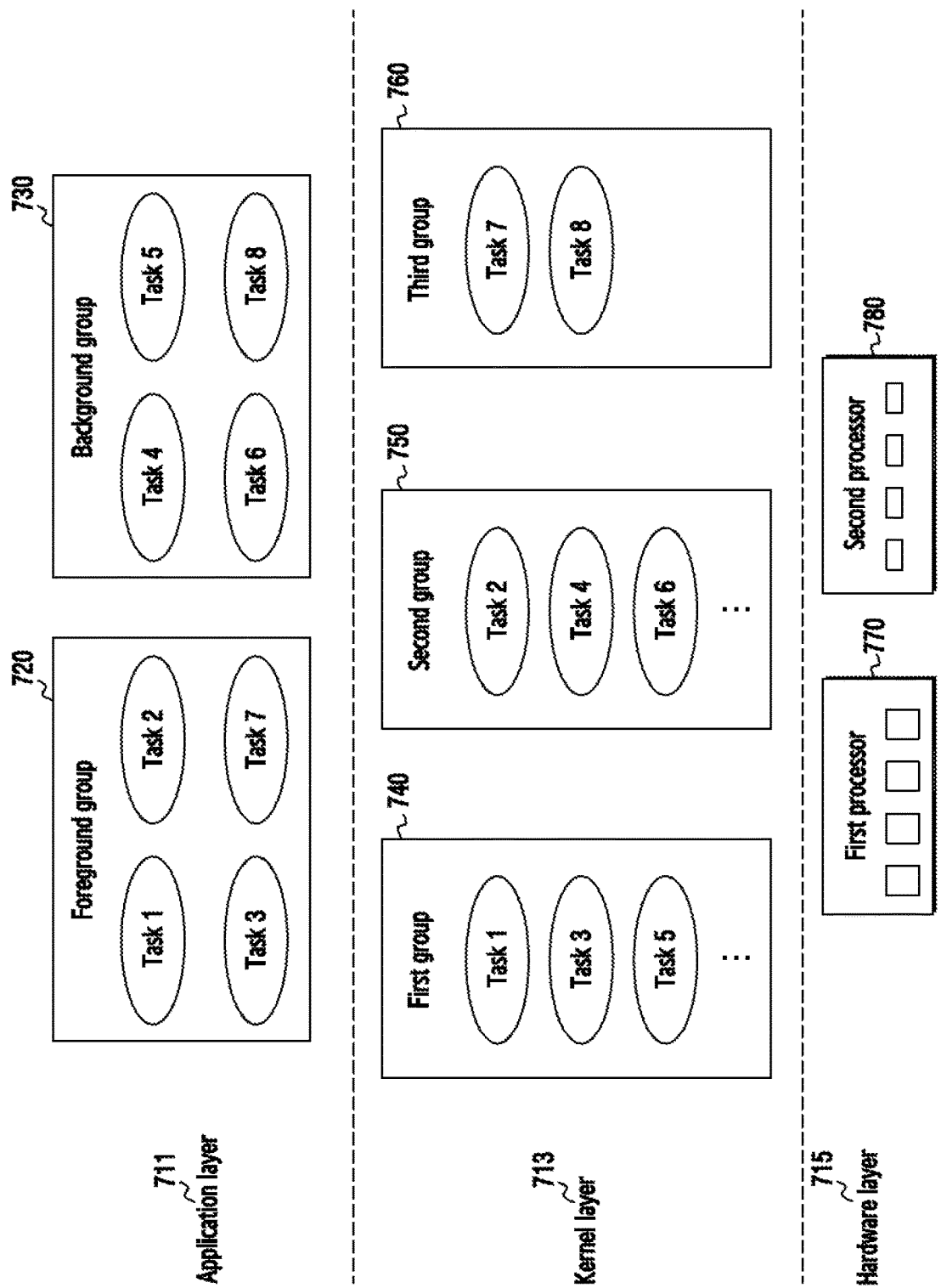
FIG. 7 is a diagram illustrating an example of allocating a group for a task in each layer according to various embodiments.

FIG. 7 is a diagram illustrating an example of allocating a group for a task in each layer according to various embodiments.

Referring to FIG. 7, when a task is generated in an application layer 711, the electronic device 101 (e.g., the group allocation module 470) may classify the generated task as a foreground group 720 or a background group 730. The group allocation module 470 may classify a task as the foreground group 720 or the background group 730 according to the order of generation or a priority of the task. For example, the group allocation module 470 may classify task 1, task 2, task 3, or task 7 as the foreground group 720, and may classify task 4, task 5, task 6, or task 8 as the background group 730.

The group allocation module 470 may allocate tasks to a first group 740 to a third group 760 of a kernel layer 713, based on the process state values or the OOM values of the tasks included in the foreground group 720 or the background group 730. For example, the group allocation module 470 may allocate task 1, task 3, or task 5 to the first group 740, may allocate task 2, task 4, or task 6 to the second group 750, and may allocate task 7 or task 8 to the third group 760. Although not illustrated, the group allocation module 470 may allocate, to a fourth group, a task that is not included in the foreground group 720 and the background group 730.

The scheduler 460 may allocate tasks included in the first group 740 to the third group 760 to the first processor 770 or the second processor 780 of a hardware layer 715, based on each schedule policy of the first group 740 to the third group 760. For example, the scheduler 460 may allocate, to the first processor 770, task 1 and task 5 included in the first group 740, or task 2 included in the second group 750. Also, the scheduler 460 may allocate the remaining tasks that are not allocated to the first processor 770 (e.g., task 3, task 4, task 6, task 7, or task 8) to the second processor 780. The scheduler 460 may set a schedule policy of each group to be different from each other, and may control the number of tasks allocated to the first processor 770 such that the minimum number of tasks are allocated to the first processor 770.

Figure 8:
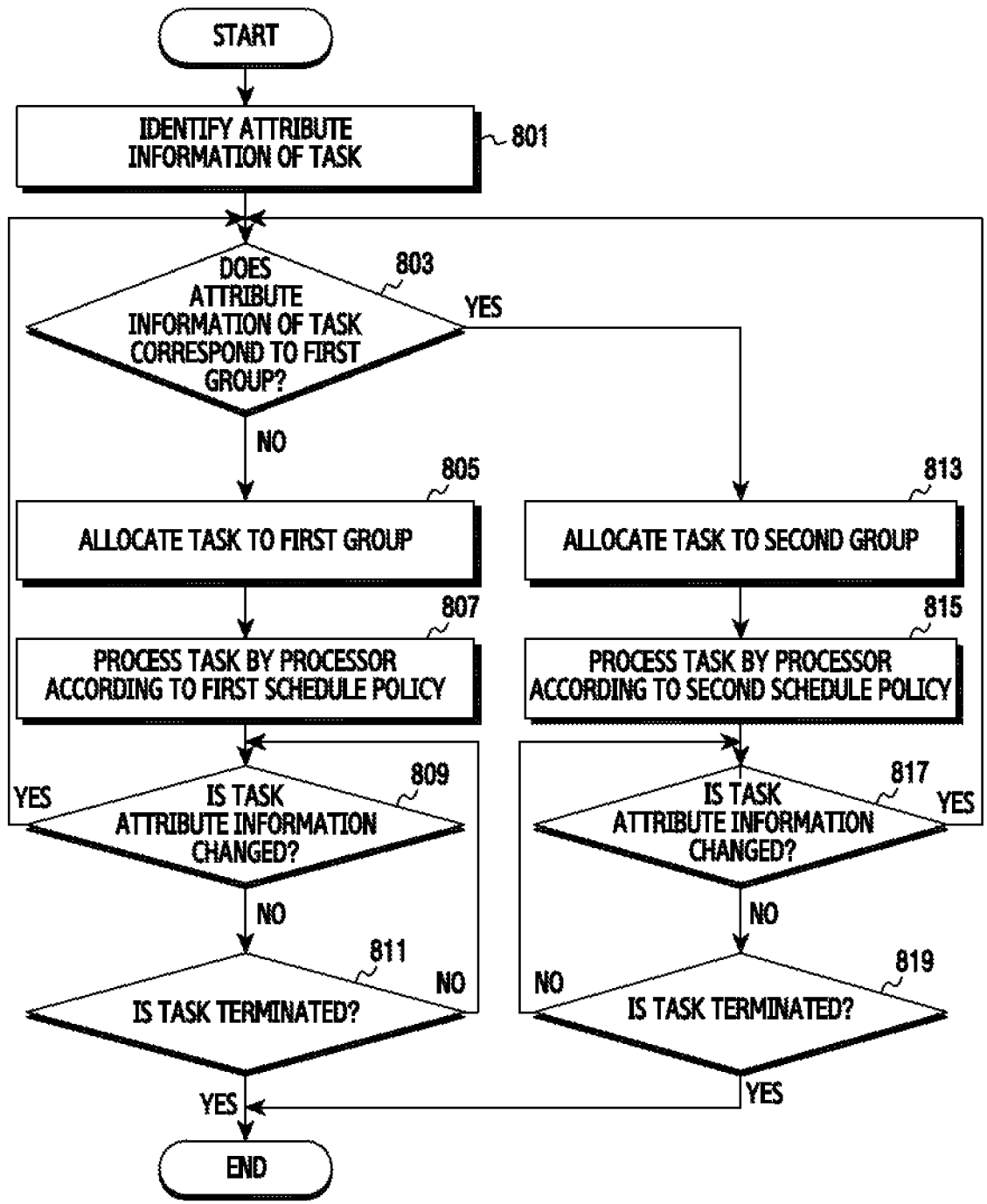
FIG. 8 is a flowchart illustrating a task group changing method of an electronic device according to various embodiments.

FIG. 8 is a flowchart illustrating a task group changing method of an electronic device according to various embodiments.

Referring to FIG. 8, in operation 801, the electronic device 101 (e.g., the group allocation module 470) may identify the attribute information of the task. For example, the attribute information may be at least one from among a process state value and an OOM value. The attribute information may be changed while a task is processed. For example, with reference to Table 1, when a user executes a first task related to a web browser, the process state value of the first task may be PROCESS_STATE_PERSISTENT_US (P, 1).

In operation 803, the electronic device 101 (e.g., the group allocation module 470) may determine whether the attribute information of the task corresponds to a first group. For example, with reference to Table 1, when a user executes a first task related to a web browser, the process state value of the first task may be PROCESS_STATE_PERSISTEN-T_US(P, 1). Since the process state value of the first task is lower than the first process state value (PROCESS_STATE_IMPORTANT_BACKGROUND(M, 4)) of the first group, the scheduler 460 may determine that the task corresponds to the first group 421.

The group allocation module 470 may perform operation 805 when the task corresponds to the first group 421, and may perform operation 813 when the task does not correspond to the first group 421.

In operation 805, the electronic device 101 (e.g., the group allocation module 470) may allocate the task to the first group 421. Operation 805 is the same as or similar to operation 609 of FIG. 6A, and thus, a detailed description thereof will be omitted.

In operation 807, the electronic device 101 (e.g., the scheduler 460) may perform a control such that the task is processed by a process according to the first schedule policy 422 of the first group 421. For example, based on the first schedule policy 422, when the process state value or the OOM value of the task satisfies the first processor allocation condition 1, the scheduler 460 may allocate the task to the first processor 440. The first processor 440 may process the allocated task. Alternatively, based on the first schedule policy 422, when the process state value or the OOM value of the task satisfies the second processor allocation condition 1, the scheduler 460 may allocate the task to the second processor 450. The second processor 450 may process the allocated task.

In operation 809, the electronic device 101 (e.g., the group allocation module 470) may determine whether the attribute information of the task is changed. For example, when the user does not terminate the web browser and execute a second task related to a message, the process state value of the first task may be changed to PROCESS_STATE_LAST_ACTIVITY(LA, 10). Since the user does not terminate the web browser (e.g., the first task), but executes the message (e.g., the second task), the process state value of the first task may be changed. For example, the second task is in the foreground state but the first task is changed from the foreground state to the background state, and the process state value or the OOM value of the first task may be changed.

When the attribute information of the task is changed, the scheduler 460 may return to operation 803. When the attribute information of the task is not changed, the scheduler 460 may perform operation 811.

In operation 811, the electronic device 101 (e.g., the group allocation module 470) may determine whether the task is terminated. When the user does not execute another task, such as a message, but continuously executes the web browser, the attribute information of the first task may not be changed. In this instance, the group allocation module 407 may determine whether the task is terminated. When the task is not terminated, the group allocation module 470 may return to operation 809 so as to determine whether the attribute information of the task is changed.

When the group allocation module 470 returns to operation 803, the group allocation module 470 may determine whether the attribute information of the task corresponds to a first group, and may allocate the task to the first group 421 or to a second group (e.g., the second group 423 to the fourth group 427). For example, when the attribute information of the task is changed even though the task is originally allocated to the first group 421, the group allocation module 470 may change a group for the task. In this instance, since the group for the task is changed, a processor to which the task is allocated may be changed.

When the task corresponds to the second group, the electronic device 101 (e.g., the group allocation module 470) may allocate the task to the second group in operation 813. Here, the second group is the name of a group that is distinct from the first group 421, and may indicate all other groups which are different from the first group. That is, although the second group is illustrated in the drawing, the second group may be one of the second group 423 to the fourth group 427.

In operation 815, the electronic device 101 (e.g., the scheduler 460) may perform a control such that the task is processed by a processor according to a second schedule policy. Here, the second schedule policy is the name of a schedule policy that is distinct from the first schedule policy 422, and may indicate all other group which are different from the first group. That is, although the second schedule policy is illustrated in the drawing, the second schedule policy may be any one of the second schedule policy 424 of the second group 423 of operation 813 to the fourth schedule policy 428 of the fourth group 427. For example, the processor according to the second schedule policy may be the second processor 450. The second processor 450 may process the task (e.g., the second task related to the web browser).

In operation 817, the electronic device 101 (e.g., the group allocation module 470) may determine whether the attribute information of the task is changed. For example, when the user does not terminate the message, but uses the web browser, the process state value of the first task may be PROCESS_STATE_TOP(T, 2). Also, the process state value of the second task related to the message may be changed to PROCESS_STATE_LAST_ACTIVITY(LA, 10).

The group allocation module 470 may return to operation 803 when the state value of the task is changed, and may perform operation 819 when the state value of the task is not changed.

For example, when the attribute information of the first task is changed while the first task related to the web browser is processed by the second processor 450, the group allocation module 470 may perform operation 803 so as to determine whether the attribute information of the first task corresponds to the first group 421. When the attribute information of the first task corresponds to the first group 421, the group allocation module 470 may allocate the first task to the first group 421. For example, since the process state value (e.g., PROCESS_STATE_TOP(T, 2)) of the first task is lower than the first process state value (e.g., PROCESS_STATE_LAST_ACTIVITY(LA, 10)) of the first group, the scheduler 460 may determine that the task corresponds to the first group 421.

Also, when the attribute information of the second task is changed while the second task related to the message is processed by the first processor 440, the group allocation module 470 may perform operation 803 so as to determine whether the attribute information of the second task corresponds to the first group 421. When the attribute information of the second task corresponds to the second group, the group allocation module 470 may allocate the second task to the second group (e.g., any one of the second group 423 to the fourth group 427). For example, since the process state value (e.g., PROCESS_STATE_SERVICE(S, 7)) of the second task exceeds the first process state value (e.g., PROCESS_STATE_IMPORTANT_BACKGROUND(IB, 4)) of the first group, the group allocation module 470 may determine that the second task corresponds to the second group.

In operation 819, the electronic device 101 (e.g., the group allocation module 470) may determine whether the task is terminated. When the task is not terminated, the group allocation module 470 may return to operation 817.

According to various embodiments, the electronic device 101 may further include a monitoring module for monitoring the user interaction, and the group allocation module 470 may dynamically change attribute information of the task based on a result of the monitoring by the monitoring module.

Figure 9A:
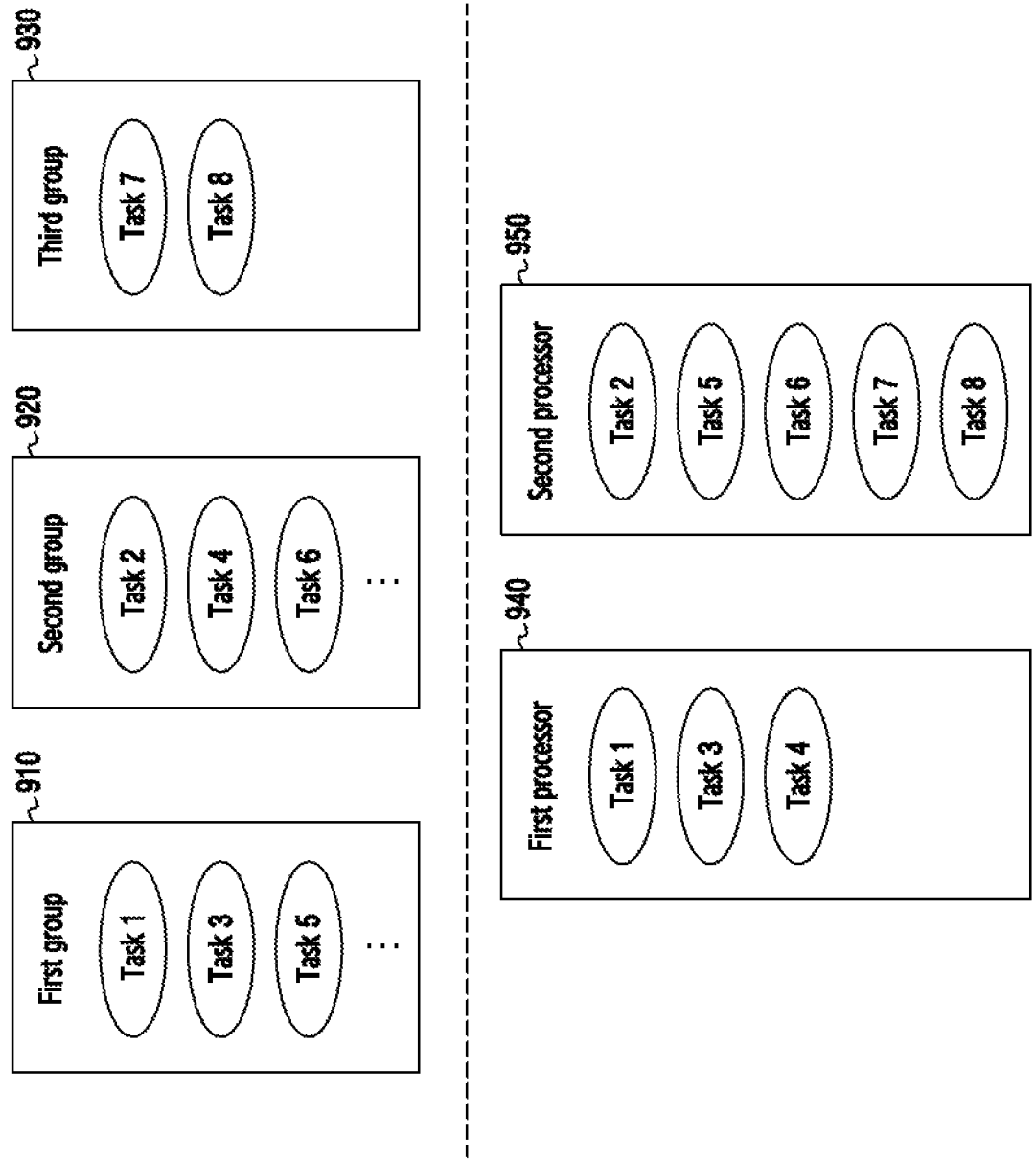
Figure 9C:
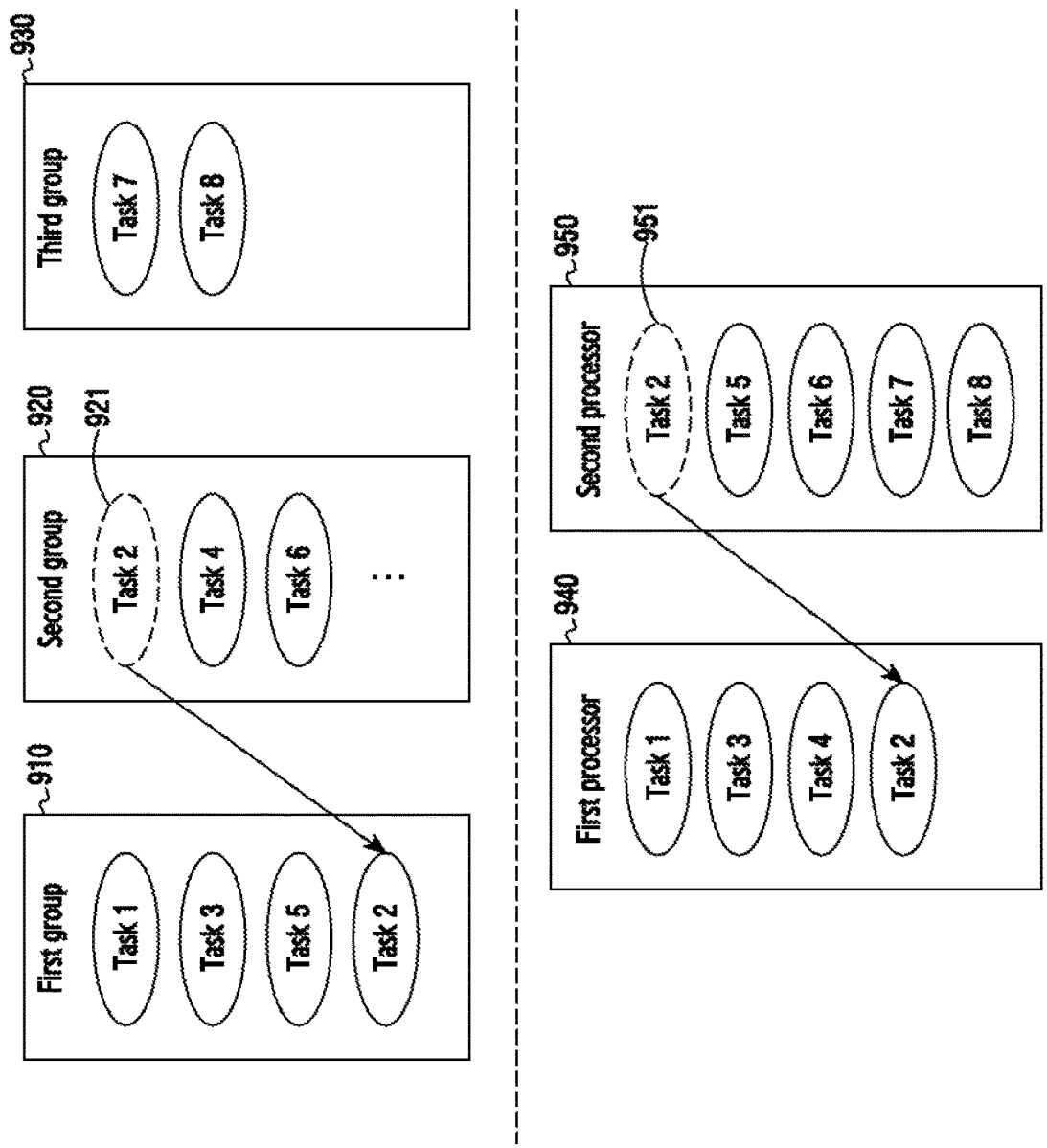

FIGS. 9A to 9C are diagrams illustrating examples of changing a group for a task by an electronic device according to various embodiments.

FIG. 9A illustrates an example in which a task is allocated to each group. Referring to FIG. 9A, the electronic device 101 (e.g., the group allocation module 470) may allocate task 1, task 3, or task 5 to a first group 910, may allocate task 2, task 4, or task 6 to a second group 920, and may allocate task 7 or task 8 to a third group 930. The scheduler 460 may allocate task 1, task 3, or task 5 to the first processor 940 or the second processor 950, based on a first schedule policy of the first group 910. For example, the scheduler 460 may allocate task 1 or task 3 included in the first group 910 to the first processor 940, and may allocate task 5 to the second group 950.

The scheduler 460 may allocate task 2, task 4, or task 6 to the first processor 940 or the second processor 950, based on a second schedule policy of the second group 920. For example, the scheduler 460 may allocate task 4 included in the second group 920 to the first processor 940, and may allocate task 2 or task 6 to the second group 950. The scheduler 460 may allocate task 7 or task 8 to the first processor 940 or the second processor 950, based on a third schedule policy of the third group 930. For example, the scheduler 460 may allocate task 7 or task 8 included in the third group 930 to the second processor 950.

According to various embodiments, the group allocation module 470 may change a group for the task when the attribute information of the task is changed while the task is processed.

FIG. 9B is a diagram illustrating an example of changing a group for a task, as the attribute information of the task is changed. Referring to FIG. 9B, the electronic device 101 (e.g., the group allocation module 470) may allocate task 1 or task 5 to the first group 910, may allocate task 2, task 3 911, task 4, or task 6 to the second group 920, and may allocate task 7 or task 8 to the third group 930. As the attribute information of the task 3 911 is changed, the group allocation module 470 may change the group for the task 3 911 from the first group 910 to the second group 920, based on the attribute information of the task 3 911. The scheduler 460 may determine a processor that is to process the task 3 911, based on the second schedule policy of the second group 920. For example, when the process state value or the OOM value of the task 3 911 corresponds to down-migration threshold 2, or corresponds to second processor allocation condition 2, the scheduler 460 may determine a processor that is to process task 3 941 as the second processor 950 according to the second schedule policy. In this instance, it is recognized that the processor to process the task 3 941 is migrated from the first processor 940 to the second processor 950.

FIG. 9C is a diagram illustrating another example of changing a group for a task, as the attribute information of the task is changed. Referring to FIG. 9C, the electronic device 101 (e.g., the group allocation module 470) may allocate task 1, task 2 921, task 3, or task 5 to the first group 910, may allocate task 4 or task 6 to the second group 920, and may allocate task 7 or task 8 to the third group 930. As the attribute information of the task 2 921 is changed, the group allocation module 470 may change the group for the task 2 921 from the second group 920 to the first group 910, based on the attribute information of the task 2 921. The scheduler 460 may determine a processor that is to process the task 2 921, based on the first schedule policy of the first group 910.

For example, when the process state value or the OOM value of the task 2 921 corresponds to up-migration threshold 1, or corresponds to first processor allocation condition 1, the scheduler 460 may determine a processor that is to process the task 2 921 as the first processor 940 according to the first schedule policy. In this instance, it is recognized that the processor to process the task 2 921 is migrated from the second processor 950 to the first processor 940.

As examples of FIGS. 9B and 9C, when the user does not terminate the web browser (e.g., the task 3 941) and executes the second task (e.g., the task 2 921) related to a message, the task 3 941 may be migrated from the first processor 940 to the second processor 950, and the task 2 921 may be migrated from the second processor 950 to the first processor 940.

Figure 10:
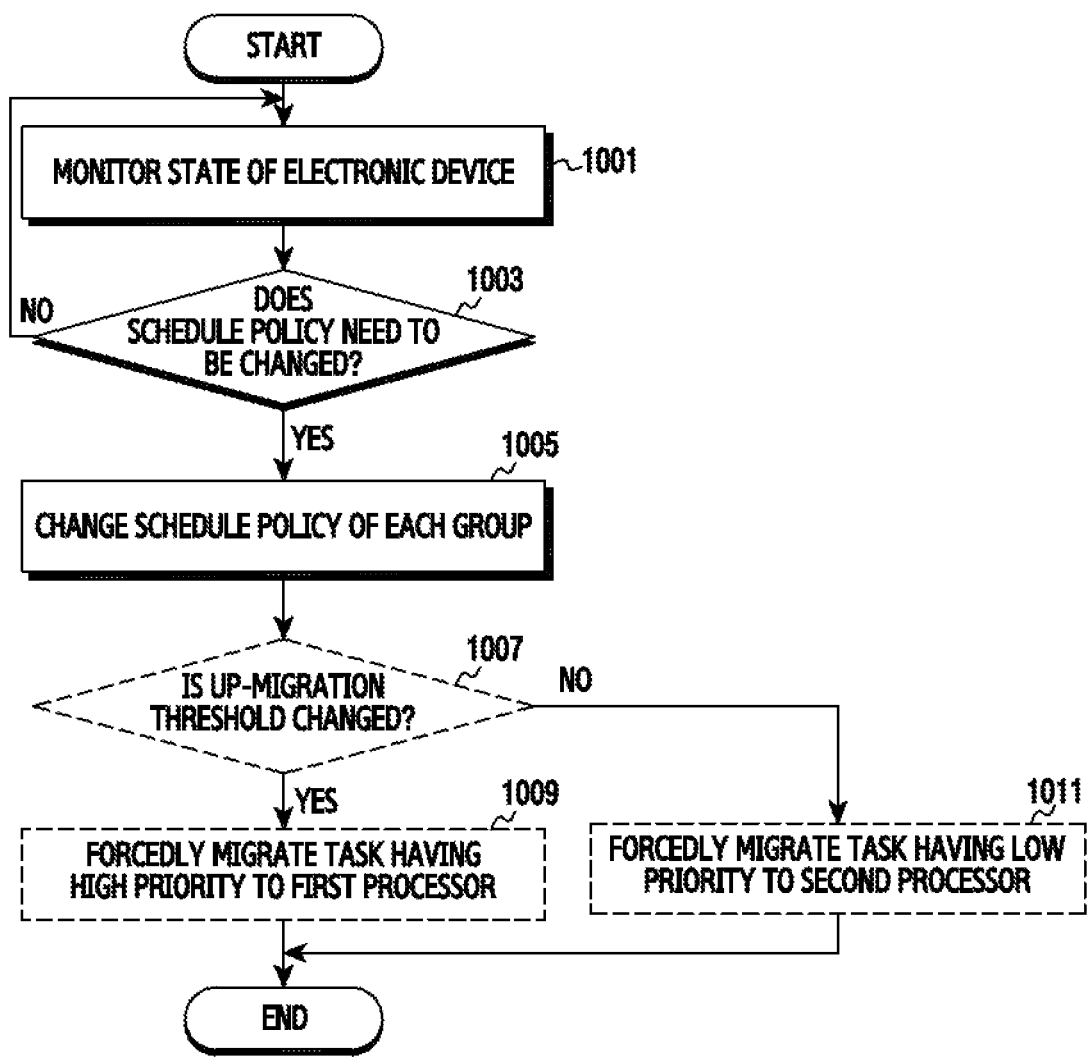
FIG. 10 is a flowchart illustrating a task migration method of an electronic device according to various embodiments.

FIG. 10 is a flowchart illustrating a task migration method of an electronic device according to various embodiments.

Referring to FIG. 10, in operation 1001, the electronic device 101 (e.g., the scheduler 460) may monitor the state of the electronic device 101. Monitoring the state of the electronic device 101 may be performed by the processor 120 and may be reported to the scheduler 460. Alternatively, the scheduler 460 may monitor the electronic device 101 in various methods. For example, the scheduler 460 may monitor whether the first processor 440 is busy, whether heat is generated in the electronic device 101, the amount of charge in the battery of the electronic device 101, whether a user input is provided, or the like.

In operation 1003, the electronic device 101 (e.g., the scheduler 460) may determine whether a schedule policy needs to be changed, based on a monitoring result.

When the schedule policy needs to be changed, the scheduler 460 may perform operation 1005, and may return to operation 1001 when the schedule policy does not need to be changed. When scheduler 460 returns to operation 1001, the scheduler 460 may monitor the state of the electronic device 101.

In operation 1005, the electronic device 101 (e.g., the scheduler 460) may change the schedule policy of each group. The scheduler 460 according to various embodiments may change at least one from among a up-migration threshold, a down-migration threshold, a first processor allocation condition, and a second processor allocation condition, which are allocated to each group (e.g., at least one of the first group 421 to the fourth group 427). For example, when the first processor 440 is busy (e.g., when the number of tasks is less than or equal to a predetermined number), the scheduler 460 may change the up-migration threshold or the first processor allocation condition set for the schedule policy of each group. Alternatively, when heat is generated in the electronic device 101 (e.g., the temperature of the electronic device 101 is greater than or equal to a predetermined temperature), the scheduler 460 may change the up-migration threshold or the first processor allocation condition set for the schedule policy of each group. Alternatively, when the amount of charge in the battery of the electronic device 101 is insufficient (e.g., the battery level of the electronic device 101 is greater than or equal to a predetermined level), the scheduler 460 may change the up-migration threshold or the first processor allocation condition set for the schedule policy of each group.

Alternatively, the opposite is possible. For example, the scheduler 460 may change the down-migration threshold or the second processor allocation condition, based on whether the first processor 440 is busy, whether heat is generated in the electronic device 101, or the amount of charge in the battery of the electronic device 101.

According to various embodiments, when a task is not allocated to the first processor 440, the scheduler 460 may change the down-migration threshold or the second processor allocation condition set for the schedule policy of each group. Alternatively, when heat is not generated in the electronic device 101 (e.g., the temperature of the electronic device 101 is less than a predetermined temperature), the scheduler 460 may change the down-migration threshold or the second processor allocation condition set for the schedule policy of each group. Alternatively, when the amount of charge in the battery of the electronic device 101 is sufficient (e.g., the battery level of the electronic device 101 is less than a predetermined level), the scheduler 460 may change the down-migration threshold or the second processor allocation condition set for the schedule policy of each group. Alternatively, the opposite is possible.

Hereinafter, operations 1007 to 1011 may or may not be executed as a schedule policy is changed by the scheduler 460. That is, operations 1007 to 1011 may be automatically executed according to a result of performing operations 1001 to 1005. That is, operations 1007 to 1011 may be omitted.

In operation 1007, the electronic device 101 (e.g., the controller 460) may determine whether the up-migration threshold is changed. For example, when the up-migration threshold set for the schedule policy of each group is changed, the scheduler 460 may perform operation 1009. When the down-migration threshold set for the schedule policy of each group is changed, the scheduler 460 may perform operation 1011.

In operation 1009, the electronic device 101 (e.g., the controller 460) may forcedly migrate a task having a low priority to a second processor. For example, when the up-migration threshold is changed, the scheduler 460 determines that a large amount of tasks are allocated to the first processor 440, and forcedly migrates tasks to the second processor 450 sequentially from a task having a low priority. The priority may be allocated when a task is generated. Alternatively, the scheduler 460 may forcedly migrate tasks to the second processor 450 sequentially from a task having a high process state value or a high OOM value. That is to decrease a heat generated in the electronic device 101, and to reduce the amount of current consumed by the electronic device 101.

In operation 1011, the electronic device 101 (e.g., the controller 460) may forcedly migrate a task having a high priority to the first processor. For example, when the down-migration threshold is changed, the scheduler 460 determines that allocation tasks to the first processor 440 is allowed, and forcedly migrates tasks to the first processor 440 sequentially from a task having a high priority. The priority may be allocated when a task is generated. Alternatively, the scheduler 460 may forcedly migrate tasks to the first processor 440 sequentially from a task having a low process state value or a low OOM value. That is to increase the efficiency of the electronic device 101.

Figure 11:
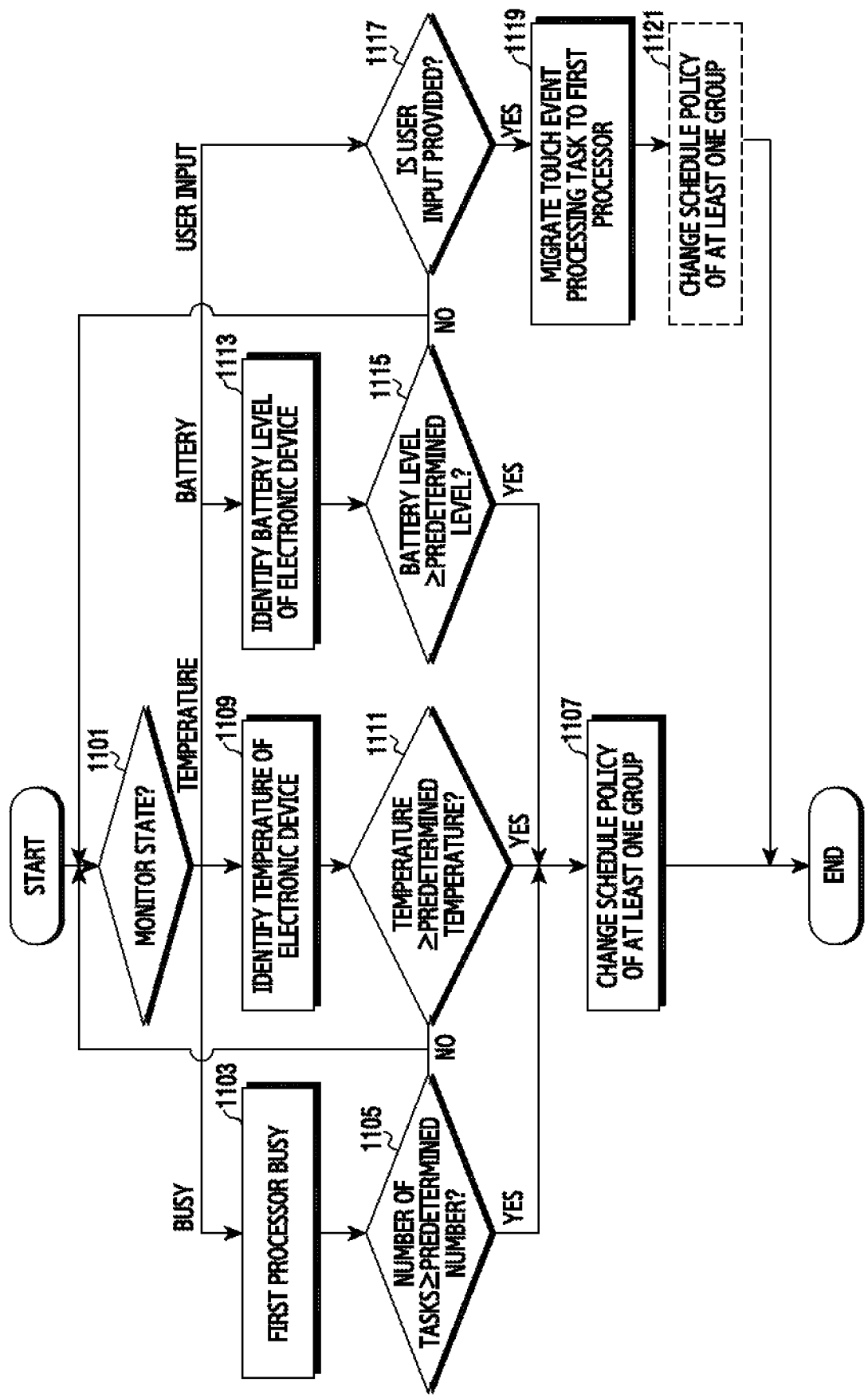
FIG. 11 is a flowchart illustrating a state monitoring-based task migration method of an electronic device according to various embodiments.

FIG. 11 is a flowchart illustrating a state monitoring-based task migration method of an electronic device according to various embodiments.

Referring to FIG. 11, in operation 1101, the electronic device 101 (e.g., a monitoring module) may monitor the state of the electronic device 101. The scheduler 460 may perform at least one of operations 1103 to 1117, based on state information of the electronic device 101. According to various embodiments, the scheduler 460 may receive a result of monitoring from the monitoring module for monitoring the state of the electronic device 101, may determine the state of the electronic device 101 based on the monitoring result, and may determine whether to change a schedule policy. The monitoring module may be implemented as a separate piece of hardware or a separate piece of software. For example, the monitoring module may monitor at least one from among the amount of load of the first processor 440, the amount of data of the electronic device 101, the amount of power consumed by of the electronic device 101, the temperature of the electronic device 101, and the battery level of the electronic device 101.

The monitoring module according to various embodiments may include monitoring modules that correspond to respective pieces of information to be monitored. For example, the monitoring module may include a load monitoring module for measuring the amount of load of the first processor 440, a data monitoring module for measuring the amount of data in the electronic device 101, a power monitoring module for measuring the amount of power consumed by the electronic device 101, a temperature monitoring module (e.g., temperature/humidity sensor 240J) for measuring the temperature of the electronic device 101, and a battery monitoring module (e.g., a battery gauge) for measuring the battery level of the electronic device 101. The monitoring module may transfer the monitoring result to the scheduler 460 or the group allocation module 470.

In operation 1103, the electronic device 101 (e.g., the scheduler 460) may determine the number of tasks in the first processor 440. In operation 1105, the electronic device 101 (e.g., the scheduler 460) may determine whether the number of tasks currently processed by the first processor 440 is greater than or equal to a predetermined number, based on the monitoring result. When the number of tasks currently processed by the first processor 440 is greater than or equal to a predetermined number, the scheduler 460 may perform operation 1107. When the number of tasks currently processed by the first processor 440 is less than the predetermined number, the scheduler 460 may return to operation 1101. Alternatively, when the number of tasks currently processed by the first processor 440 is less than a predetermined number, the scheduler 460 may perform operation 1109.

In operation 1109, the electronic device 101 (e.g., the scheduler 460) may determine the temperature of the electronic device 101. In operation 1111, the electronic device 101 (e.g., the scheduler 460) may determine whether the temperature of the electronic device 101 is greater than or equal to a predetermined temperature, based on the monitoring result. When the temperature of the electronic device 101 is greater than or equal to the predetermined temperature, the scheduler 460 may perform operation 1107, when the temperature of the electronic device 101 is less than the predetermined temperature, the scheduler 460 may return to operation 1101. Alternatively, the scheduler 460 may perform operation 1113 when the temperature of the electronic device 101 is less than the predetermined temperature.

In operation 1113, the electronic device 101 (e.g., the scheduler 460) may check the battery of the electronic device 101. In operation 1115, the electronic device 101 (e.g., the scheduler 460) may determine whether the battery level of the electronic device 101 is greater than or equal to a predetermined level, based on the monitoring result. When the battery level of the electronic device 101 is greater than or equal to the predetermined level, the scheduler 460 may perform operation 1107, when the battery level of the electronic device 101 is less than the predetermined level, the scheduler 460 may return to operation 1101. Alternatively, the scheduler 460 may perform operation 1117 when the battery level of the electronic device 101 is less than the predetermined level.

In addition, when a predetermined criterion is satisfied, the scheduler 460 may perform operation 1107. The predetermined criterion may be set by a user, or may be set as a default value in the electronic device 101. For example, the set criterion may include the amount of load of the first processor 440, the amount of data, the amount of power consumed, or the amount of charge in the battery consumed.

In operation 1107, the electronic device 101 (e.g., the scheduler 460) may change a scheduler policy of at least one group. For example, the electronic device 101 may change at least some of a schedule policy allocated to at least one group, that is, at least one from among a up-migration threshold, a down-migration threshold, a first processor allocation condition, and a second processor allocation condition of a corresponding group (e.g., at least one of the first group 421 to the fourth group 427). For example, when the schedule policy of each group is changed, a task in the first processor 440 may be migrated to the second processor 450. An example of migrating the task in the first processor 440 to the second processor 450 has been described with reference to FIG. 9B. That is, when the condition (e.g., operation 1105, operation 1111, and operation 1115) is satisfied, the scheduler 460 may change the schedule policy of each group.

For example, when the number of tasks currently processed by the first processor 440 is greater than or equal to a predetermined number, the scheduler 460 may change the first schedule policy 422 of the first group 421. By performing the above operation, some tasks in the first processor 440 may be migrated to the second processor 450. Alternatively, the scheduler 460 may change the schedule policy of each group when the temperature of the electronic device 101 is greater than or equal to a predetermined temperature. In this instance, some tasks in the first processor 440 may be migrated to the second processor 450. Alternatively, the scheduler 460 may change the schedule policy of each group when the battery level of the electronic device 101 is greater than or equal to a predetermined level. In this instance, some tasks in the first processor 440 may be migrated to the second processor 450.

In operation 1117, the electronic device 101 (e.g., the scheduler 460) may determine whether a user input is provided. The user input may be a touch input or an input pressing a button (e.g., a home button, a volume button, a lock button, or the like). Alternatively, the user input may be an input that executes a function or an application in the electronic device 101. In operation 1119, the electronic device 101 (e.g., the scheduler 460) may allocate a task corresponding to a user input to the first processor 440. The scheduler 460 may allocate the task corresponding to the user input to the first processor 440, so as to quickly process the task corresponding to the user input. In operation 1121, the electronic device 101 (e.g., the scheduler 460) may change a scheduler policy of each group.

According to various embodiments, operation 1121 may or may not be performed. The scheduler 460 may determine whether to perform operation 1121, based on at least one from among the number of tasks in the first processor 440, the temperature of the electronic device 101, and the amount of charge in the battery of the electronic device 101. For example, when the task corresponding to the user input is allocated to the first processor 440, the number of tasks in the first processor 440, the temperature of the electronic device 101, and the amount of charge in the battery of the electronic device 101 may be changed.

Figure 12:
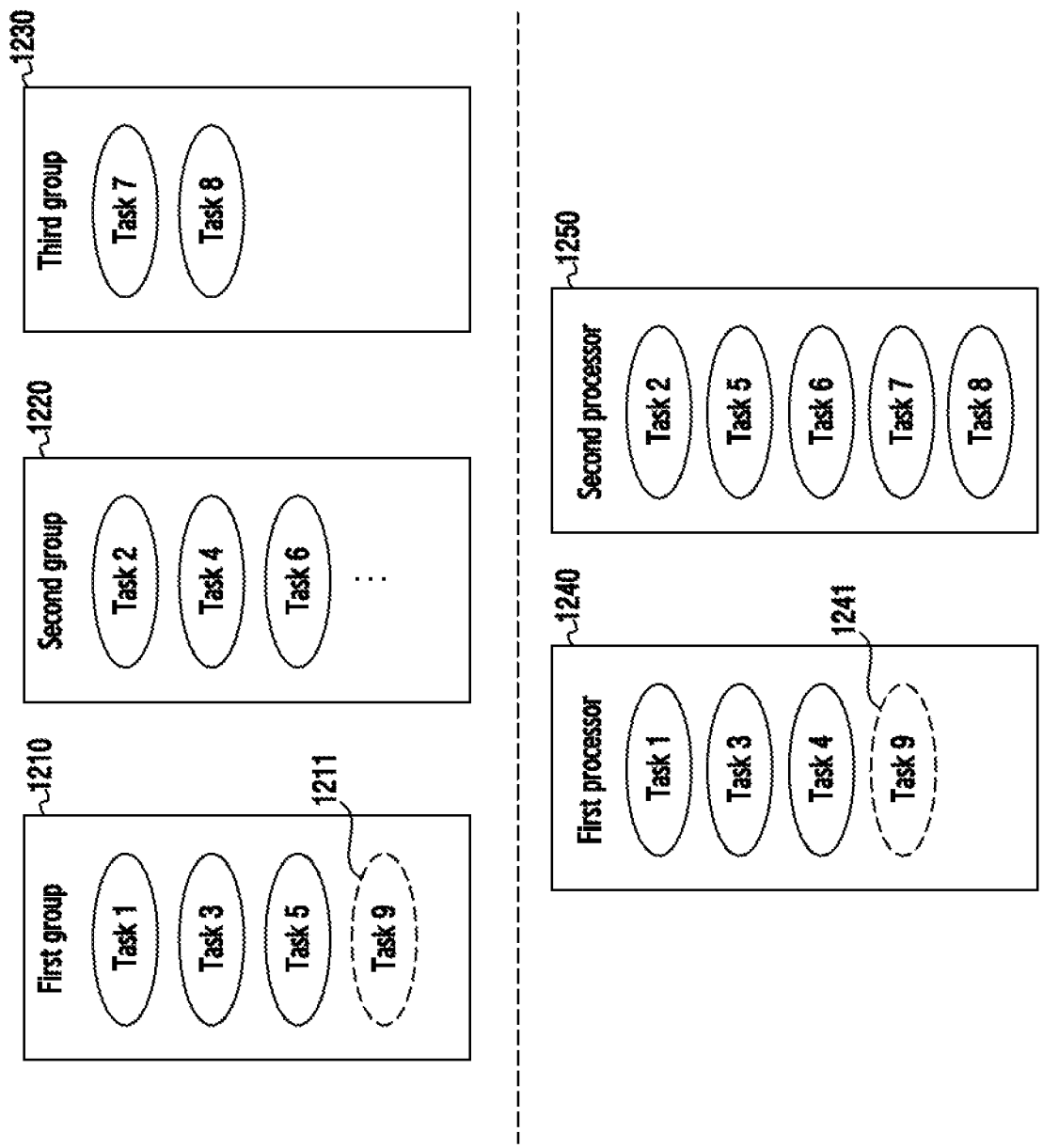
FIG. 12 is a diagram illustrating an example of migrating a task by an electronic device according to various embodiments.

FIG. 12 is a diagram illustrating an example of migrating a task by an electronic device according to various embodiments.

Referring to FIG. 12, the electronic device 101 (e.g., the group allocation module 470) may allocate task 1, task 3, or task 5 to a first group 1210, may allocate task 2, task 4, or task 6 to a second group 1220, and may allocate task 7 or task 8 to a third group 1230. The scheduler 460 may allocate task 1, task 3, or task 4 to the first processor 1240, and may allocate task 2, task 5, task 6, task 7, or task 8 to the second processor 1250, based on the schedule policy of each group.

The first processor 1240 may process task 1, task 3, or task 4. The second processor 1250 may process task 2, task 5, task 6, task 7, or task 8.

When task 9 1211 is generated based on a user input, the group allocation module 470 may allocate the task 9 1211 to the first group 1210. When a user input is provided, the scheduler 460 may allocate the task 9 1211 corresponding to the user input to the first group 1210 so as to quickly process the provided user input. The scheduler 460 may allocate the task 9 1241 to the first processor 1240, based on a first schedule policy of the first group 1210. The first processor 1240 may process the task 9 141 together with the task 1, the task 3, or the task 4.

An operation method of an electronic device according to various embodiments may include identifying a task loaded in a memory of the electronic device, selecting a processor to execute the task from among a first processor of the electronic device and a second processor of the electronic device, based on attribute information corresponding to a user interaction related to the task, and allocating the task to the selected processor.

The operation of selecting the processor may include storing a first schedule policy corresponding to a first group and a second schedule policy corresponding to a second group in the memory, determining a group corresponding to the task from among the first group and the second group, based at least on the attribute information, identifying a schedule policy corresponding to the determined group, and selecting the processor, based at least on the identified schedule policy.

The operation method may further include changing the first schedule policy or the second schedule policy, based at least on state information of the electronic device.

The state information may include at least one from among load information of the first processor or the second processor, temperature information of the electronic device, power state information of the electronic device, and user input state information of the electronic device.

The first schedule policy or the second schedule policy may include at least one from among selection criterion information corresponding to the first processor or the second processor, selection limit information, and boosting information.

The operation method may further include migrating a task currently processed by the first processor to the second processor, or migrating a task currently processed by the second processor to the first processor, based on the changed schedule policy or the attribute information of the task.

The attribute information may include at least one from among process state information and out-of-memory (00M) information.

The operation method may further include monitoring the user interaction, and dynamically changing the attribute information of the task based on a result of monitoring.

The computer-readable recording medium may include a hard disk, a floppy disk, a magnetic medium (e.g., a magnetic tape), an optical recording medium (e.g., a compact disk-read only memory (CD-ROM), a digital versatile disk (DVD)), a magneto-optical medium (e.g., a floptical disk), an internal memory, etc. The instruction may include a code which is made by a compiler or a code which is executable by an interpreter. The module or program module according to various embodiments may include at least one or more of the aforementioned constituent elements, or omit some of them, or further include another constituent element. Operations carried out by the module, the program module or the another constituent element according to various embodiments may be executed in a sequential, parallel, repeated or heuristic manner, or at least some operations may be executed in different order or may be omitted, or another operation may be added.

While the present disclosure has been shown and described with reference to certain embodiments thereof, it will be apparent to those skilled in the art according to the present disclosure is not limited to these embodiments, and various changes in form and details may be made therein without departing from the spirit and scope of the present disclosure as defined by the appended claims.

The invention claimed is:

1. An electronic device, comprising:
   a memory;
   a first processor;
   a second processor having an attribute different from a second attribute of the first processor; and
   a controller,
   wherein the controller is configured to:
      identify a task loaded in the memory;
      select a processor to execute the task from among the first processor and the second processor, based on attribute information of the task, the attribute information corresponding to a degree of user interaction with the task while the task is executing; and
      allocate the task to the selected processor.

2. The electronic device of claim 1, wherein the memory stores a first schedule policy corresponding to a first group and a second schedule policy corresponding to a second group,
   the electronic device further comprises a group allocation module configured to determine a group corresponding to the task from among the first group and the second group, based at least on the attribute information, and
   the controller is configured to:
      identify a schedule policy corresponding to the determined group; and
      select the processor, based at least on the identified schedule policy.

3. The electronic device of claim 2, wherein the group allocation module is configured to determine a group corresponding to the task from among the first group and the second group, based at least on changed attribute information of the task when the attribute information is changed, and
   the controller is configured to: identify a schedule attribute corresponding to the determined group; and
   select the processor, based at least on the identified schedule policy.

4. The electronic device of claim 2, wherein the controller is configured to change the first schedule policy or the second schedule policy, based at least on state information of the electronic device.

5. The electronic device of claim 4, wherein the state information is configured to include at least one from among load information of the first processor or the second processor, temperature information of the electronic device, power state information of the electronic device, and user input state information of the electronic device.

6. The electronic device of claim 4, wherein the first schedule policy or the second schedule policy is configured to include at least one from among selection criterion information corresponding to the first processor or the second processor, selection limit information, and boosting information.

7. The electronic device of claim 4, wherein the controller is configured to change a schedule policy such that a task processed by the first processor is migrated to the second processor, or a task processed by the second processor is migrated to the first processor, based on the attribute information of the task.

8. The electronic device of claim 1, wherein the attribute information is configured to include at least one from among process state information and out-of-memory (OOM) information.

9. The electronic device of claim 8, wherein the controller is configured to set a schedule policy to migrate a task having a high set value included in the process state information or the OOM information from the first processor to the second processor, based at least on the state information of the electronic device.

10. The electronic device of claim 8, wherein the controller is configured to set a schedule policy to migrate a task having a low set value included in the process state information or the OOM information from the second processor to the first processor, based at least on the state information of the electronic device.

11. The electronic device of claim 1, further comprising:
a monitoring module configured to monitor the user interaction; and
a group allocation module configured to dynamically change attribute information of the task based on a result of monitoring performed by the monitoring module.

12. The electronic device of claim 1, wherein the controller is configured to: set a schedule policy of each group to be different from each other; and allocate the task to the first processor or the second processor, based on a schedule policy allocated to each group.

13. An operation method of an electronic device, the method comprising:
identifying a task loaded in a memory of the electronic device;
selecting a processor to execute the task from among a first processor of the electronic device and a second processor of the electronic device, based on attribute information of the task, the attribute information corresponding to a degree of user interaction with the task while the task is executing; and
allocating the task to the selected processor.

14. The method of claim 13, wherein the selecting comprises:
storing a first schedule policy corresponding to a first group and a second schedule policy corresponding to a second group in the memory;
determining a group corresponding to the task from among the first group and the second group, based at least on the attribute information;
identifying a schedule policy corresponding to the determined group; and
selecting the processor, based at least on the identified schedule policy.

15. The method of claim 14, further comprising:
changing the first schedule policy or the second schedule policy, based at least on state information of the electronic device.

* * * * *